(12) United States Patent
Wu et al.

(10) Patent No.: US 10,520,914 B2
(45) Date of Patent: Dec. 31, 2019

(54) MULTI CLUSTER TOOL SYSTEM AND A METHOD OF CONTROLLING A MULTI TOOL CLUSTER SYSTEM

(71) Applicant: Macau University of Science and Technology, Taipa (MO)

(72) Inventors: Naiqi Wu, Taipa (MO); Fajun Yang, Taipa (MO); Liping Bai, Taipa (MO); Mengchu Zhou, Taipa (MO); Zhiwu Li, Taipa (MO)

(73) Assignee: MACAU UNIVERSITY OF SCIENCE AND TECHNOLOGY, Taipa (MO)

( * ) Notice: Subject to any disclaimer, the term of this patent is extended or adjusted under 35 U.S.C. 154(b) by 222 days.

(21) Appl. No.: 15/268,851

(22) Filed: Sep. 19, 2016

(65) Prior Publication Data
US 2018/0081336 A1    Mar. 22, 2018

(51) Int. Cl.
G05B 19/29    (2006.01)
G05B 19/418    (2006.01)

(52) U.S. Cl.
CPC ....... *G05B 19/29* (2013.01); *G05B 19/41815* (2013.01); *G05B 19/41865* (2013.01); *G05B 2219/25419* (2013.01); *G05B 2219/45031* (2013.01); *Y02P 90/08* (2015.11); *Y02P 90/20* (2015.11)

(58) Field of Classification Search
CPC ................ G05B 19/0426; G05B 19/29; G05B 2219/25419
See application file for complete search history.

(56) References Cited

U.S. PATENT DOCUMENTS

| 6,418,350 B1 * | 7/2002 | Hamidzadeh | .... G05B 19/41865 700/100 |
| 6,519,498 B1 * | 2/2003 | Jevtic | ............... G05B 19/41865 700/100 |

(Continued)

OTHER PUBLICATIONS

N. Brauner, "Identical Part Production in Cyclic Robotic Cells: Concepts, Overview and Open Questions", Discrete Applied Mathematics, vol. 156, No. 13, 2008, pp. 2480-2492; DOI: 10.1016/j.dam.2008.03.021.

(Continued)

*Primary Examiner* — Nathan L Laughlin
(74) *Attorney, Agent, or Firm* — Renner Kenner Greive Bobak Taylor & Weber

(57) ABSTRACT

A system and method of controlling a multi cluster tool system configured to process a semiconductor product includes a plurality of cluster tools arranged adjacent each other, a buffer module positioned between a pair of cluster tools, each cluster tool including a plurality of processing modules and a robot, the method of controlling a multi cluster tool system including receiving a plurality of system parameters from a user interface, wherein the system parameters correspond to one or more processing steps in a system cycle, wherein the system cycle is a cycle of processing the semiconductor product, determining a system schedule for defining the system cycle for processing a semiconductor product, the system schedule providing robot waiting times for each robot of each cluster tool, controlling, via a controller, the operation of each robot of each cluster tool based on the determined schedule.

10 Claims, 9 Drawing Sheets

(56) References Cited

U.S. PATENT DOCUMENTS

| | | | | |
|---|---|---|---|---|
| 2004/0089421 A1* | 5/2004 | Komandur | ........ | H01L 21/67028 156/345.32 |
| 2008/0017109 A1* | 1/2008 | Chiang | ................. | C23C 14/042 118/719 |
| 2010/0327873 A1* | 12/2010 | Dorf | ................. | H01J 37/32935 324/464 |

OTHER PUBLICATIONS

W. K. V. Chan, J. Yi, and S. Ding, "Optimal Scheduling of Multicluster Tools with Constant Robot Moving Times, Part I: Two-Cluster Analysis", IEEE Transactions on Automation Science and Engineering, vol. 8, No. 1, Jan. 2011, pp. 5-16; DOI: 10.1109/TASE.2010.2046891.

W. K. V. Chan, S. Ding, J. Yi, and D. Song, "Optimal Scheduling of Multicluster Tools with Constant Robot Moving Times, Part II: Tree-Like Topology Configurations", IEEE Transactions on Automation Science and Engineering, vol. 8, No. 1, Jan. 2011, pp. 17-28; DOI: 10.1109/TASE.2010.2046893.

Y. Crama, V. Kats, J. Van De Klundert and E. Levner, "Cyclic Scheduling in Robotic Flowshops", Annals of Operations Research, vol. 96, 2000, pp. 97-124.

M. Dawande, C. Sriskandarajah, and S. Sethi, "On Throughput Maximization in Constant Travel-Time Robotic Cells", Manufacturing & Service Operations Management, 2002, vol. 4, No. 4, Fall 2002, pp. 296-312.

S. Ding, J. Yi, and M. T. Zhang, "Multicluster Tools Scheduling: An Integrated Event Graph and Network Model Approach", IEEE Transactions on Semiconductor Manufacturing, vol. 19, No. 3, Aug. 2006, pp. 339-351; DOI: 10.1109/TSM.2006.879414.

J-H Kim, T-E Lee, H-Y Lee, and D-B Park, "Scheduling Analysis of Time-Constrained Dual-Armed Cluster Tools", IEEE Transactions on Semiconductor Manufacturing, vol. 16, No. 3, Aug. 2003, pp. 521-534; DOI: 10.1109/TSM.2003.815203.

H-Y Lee and T-E Lee, "Scheduling Single-Armed Cluster Tools with Reentrant Wafer Flows", IEEE Transactions on Semiconductor Manufacturing, vol. 19, No. 2, May 2006, pp. 226-240; DOI: 10.1109/TSM.2006.873402.

S. P. Sethi, J. B. Sidney, and C. Sriskandarajah, "Scheduling in Dual Gripper Robotic Cells for Productivity Gains", IEEE Transactions on Robotics and Automation, vol. 17, No. 3, Jun. 2001, pp. 324-341.

S. P. Sethi, C. Sriskandarajah, G. Sorger, J. Blazewicz, and W. Kubiak, "Sequencing of Parts and Robot Moves in a Robotic Cell", International Journal of Flexible Manufacturing Systems, vol. 4, 1992, pp. 331-358.

N. Q. Wu, "Necessary and Sufficient Conditions for Deadlock-Free Operation in Flexible Manufacturing Systems Using a Colored Petri Net Model", IEEE Transactions on Systems, Man, and Cybernetics—Part C: Applications and Reviews, vol. 29, No. 2, May 1999, pp. 192-204.

N. Q. Wu, C. Chu, F. Chu, and M. C. Zhou, "A Petri Net Method for Schedulability and Scheduling Problems in Single-Arm Cluster Tools with Wafer Residency Time Constraints", IEEE Transactions on Semiconductor Manufacturing, vol. 21, No. 2, May 2008, pp. 224-237; DOI: 10.1109/TSM.2008.2000425.

N. Q. Wu, F. Chu, C. B. Chu, and M. C. Zhou, "Petri Net-Based Scheduling of Single-Arm Cluster Tools with Reentrant Atomic Layer Deposition Processes", IEEE Transactions on Automation Science and Engineering, vol. 8, No. 1, Jan. 2011, pp. 42-55; DOI: 10.1109/TASE.2010.2046736.

N. Q. Wu, F. Chu, C. Chu, and M. C. Zhou, "Petri Net Modeling and Cycle-Time Analysis of Dual-Arm Cluster Tools with Wafer Revisiting", IEEE Transactions on Systems, Man, and Cybernetics: Systems, vol. 43, No. 1, Jan. 2013, pp. 196-207; DOI: 10.1109/TSMCA.2012.2187890.

N. Q. Wu and M. C. Zhou, "Avoiding Deadlock and Reducing Starvation and Blocking in Automated Manufacturing Systems", IEEE Transactions on Robotics and Automation, vol. 17, No. 5, Oct. 2001, pp. 658-669.

N. Q. Wu & M. C. Zhou, "Process vs. Resource-Oriented Petri Net Modeling of Automated Manufacturing Systems", Asian Journal of Control, vol. 12, No. 3, May 2010, pp. 267-280.

N. Q. Wu and M. C. Zhou, "A Closed-Form Solution for Schedulability and Optimal Scheduling of Dual-Arm Cluster Tools with Wafer Residency Time Constraint Based on Steady Schedule Analysis", IEEE Transactions on Automation Science and Engineering, vol. 7, No. 2, Apr. 2010, pp. 303-315; DOI: 10.1109/TASE.2008.2008633.

N. Q. Wu, M. C. Zhou, F. Chu, and C. B. Chu, "A Petri-Net-Based Scheduling Strategy for Dual-Arm Cluster Tools with Wafer Revisiting", IEEE Transactions on Systems, Man, and Cybernetics: Systems, vol. 43, No. 5, Sep. 2013, pp. 1182-1194; DOI: 10.1109/TSMCA.2012.2230440.

N. Q. Wu, M. C. Zhou, and Z. W. Li, "Resource-Oriented Petri Net for Deadlock Avoidance in Flexible Assembly Systems", IEEE Transactions on Systems, Man, and Cybernetics—Part A: Systems and Humans, vol. 38, No. 1, Jan. 2008, pp. 56-69; DOI: 10.1109/TSMCA.2007.909542.

F. J. Yang, N. Q. Wu, Y. Qiao, and M. C. Zhou, "Petri Net-Based Optimal One-Wafer Cyclic Scheduling of Hybrid Multi-Cluster Tools in Wafer Fabrication", IEEE Transactions on Semiconductor Manufacturing, vol. 27, No. 2, May 2014, pp. 192-203; DOI: 10.1109/TSM.2014.2312192.

F. J. Yang, N. Q. Wu, Y. Qiao, and M. C. Zhou, "Petri Net-Based Polynomially Complex Approach to Optimal One-Wafer Cyclic Scheduling of Hybrid Multi-Cluster Tools in Semiconductor Manufacturing", IEEE Transactions on Systems, Man, and Cybernetics: Systems, vol. 44, No. 12, Dec. 2014, pp. 1598-1610; DOI: 10.1109/TSMC.2014.2318679.

J. Yi, S. Ding, D. Song, and M. T. Zhang, "Steady-State Throughput and Scheduling Analysis of Multicluster Tools: A Decomposition Approach", IEEE Transactions on Automation Science and Engineering, vol. 5, No. 2, Apr. 2008, pp. 321-336; DOI: 10.1109/TASE.2007.906678.

Q. H. Zhu, N. Q. Wu, Y. Qiao, and M. C. Zhou, "Petri Net-Based Optimal One-Wafer Scheduling of Single-Arm Multi-Cluster Tools in Semiconductor Manufacturing", IEEE Transactions on Semiconductor Manufacturing, vol. 26, No. 4, Nov. 2013, pp. 578-591; DOI: 10.1109/TSM.2013.2278378.

Q. H. Zhu, N. Q. Wu, Y. Qiao, and M. C. Zhou, "Scheduling of Single-Arm Multi-Cluster Tools with Wafer Residency Time Constraints in Semiconductor Manufacturing", IEEE Transactions on Semiconductor Manufacturing, vol. 28, No. 1, Feb. 2015, pp. 117-125; DOI: 10.1109/TSM.2014.2375880.

* cited by examiner

Time duration associated with transitions and places 600

| Symbol | Transition or place | Action | Time duration |
|---|---|---|---|
| $\lambda_i$ | $t_{ij} \in T$ | $R_i$ loads a wafer into Step $j$, $j \in \Omega_{n[i]}$ | $\lambda_i$ |
| | $u_{ij} \in T$ | $R_i$ unloads a wafer from Step $j$, $j \in \Omega_{n[i]}$ | $\mu_i$ |
| $\mu_i$ | $x_{ij} \in T$ | $R_i$ moves from Steps $j$ to $j+1$, $j \in \Omega_{n[i]-1}$ | |
| | $x_{(n[i])j} \in T$ | $R_i$ moves from Steps $n[i]$ to 0 | |
| | $y_{ij} \in T$ | $R_i$ moves from Steps $m$ to $j$, $m \neq j$ and $m$, $j \in \Omega_{n[i]}$ | 0 |
| | $y_{ij} \in T$ | $R_i$ moves from Step $j$ to $j$, $j \in \Omega_{n[i]}$ | $\geq \alpha_{ij}$ |
| $p_{ij}$ | $p_{ij} \in P$ | A wafer being processed and waiting in $p_{ij}$, $j \in \Omega_{n[i]}$ | |
| $\omega_{ij}$ | $q_{ij} \in P$ | $R_i$ waits before unloading a wafer from Step $j$, $j \in \Omega_{n[i]}$ | $\geq 0$ |
| | $z_{ij}$ and $d_{ij} \in P$ | No robot task is associated | 0 |

Fig.6

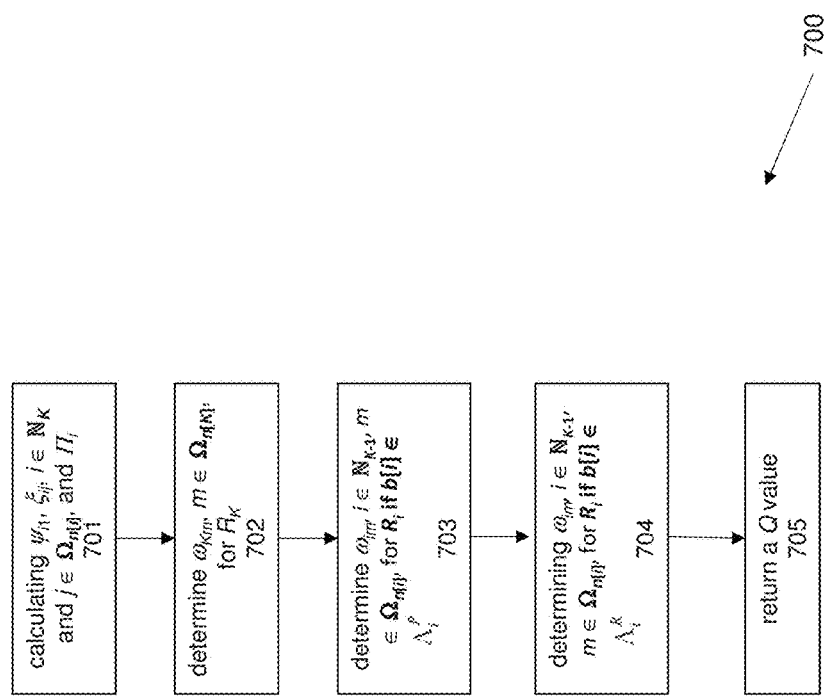

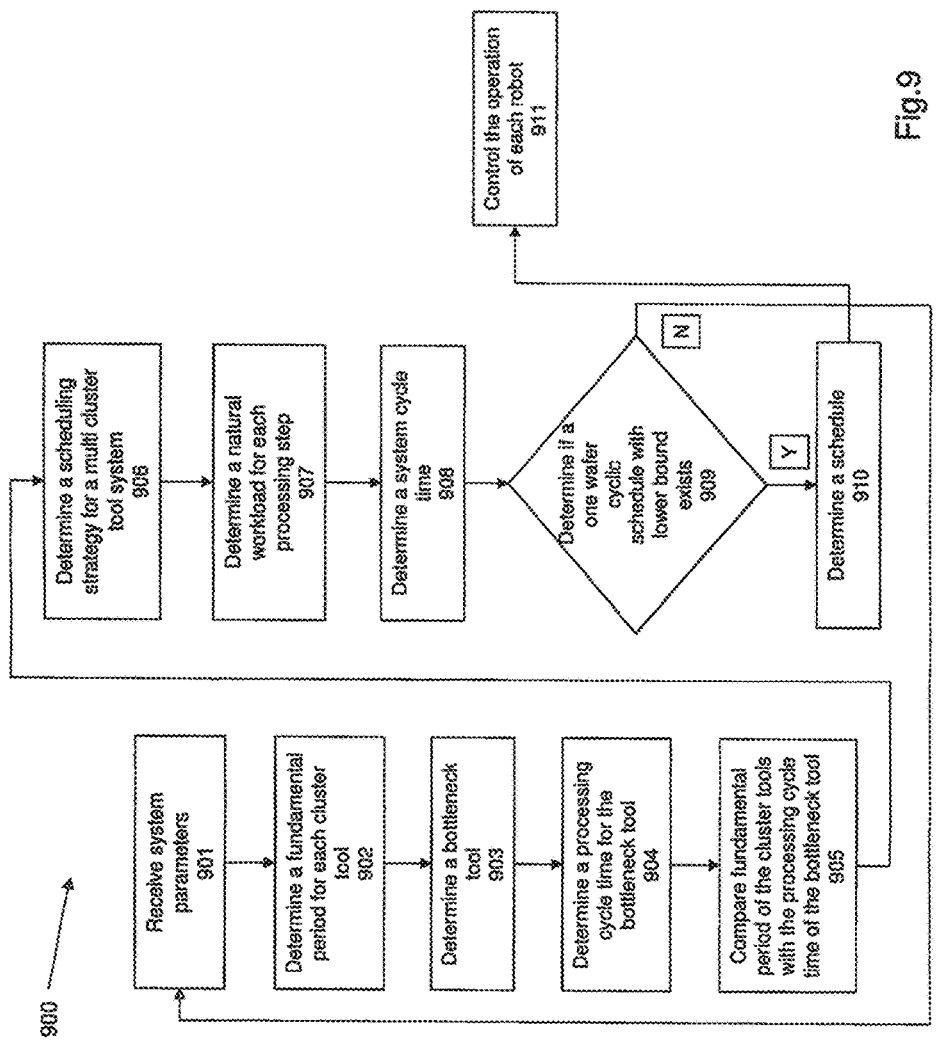

MULTI CLUSTER TOOL SYSTEM AND A METHOD OF CONTROLLING A MULTI TOOL CLUSTER SYSTEM

TECHNICAL FIELD

The present disclosure relates to a multi tool cluster system and a method of controlling a multi tool cluster tool system.

BACKGROUND

Semiconductors are ubiquitous in modern society and used in a wider range of uses. Some examples are modern electronic components such as diodes, transistors, etc. Semiconductors are also used commonly to create wafers or substrates that can be used in electronics for fabrication of integrated circuits or printed circuit boards or photovoltaic cells. Wafer fabrication processes are carefully controlled and managed processes.

Cluster tools are increasingly used in the semiconductor manufacturing industry for semiconductor product fabrication. For example cluster tools are increasingly being used in wafer manufacturing. Cluster tools are integrated machines that are used to manufacture wafers utilizing known manufacturing processes. Cluster tools are electronically controlled machines that automatically function based on a programmed control schedule. Cluster tools provide a flexible, reconfigurable and efficient environment, resulting in higher productivity while resulting in shorter cycle times.

Multi cluster tool systems are increasingly used for more complicated semiconductor processing procedures. For example more complex wafer processing procedures require multi cluster tool systems. A multi cluster tool system is formed when a plurality of cluster tools i.e. single cluster tools are located adjacent each other and connected to each other. When K number of single cluster tools makes up a multi cluster tool system, it is referred to as a K cluster tool system.

There is economic interest in optimizing the semiconductor product manufacturing process to maximize the production of semiconductor products (e.g. wafers) by reducing manufacturing time. There exists a need to improve the control of the multi cluster tool system to reduce inefficiencies and minimize waiting times within a system cycle i.e. a semiconductor processing cycle. It is an object of the present disclosure to provide a multi cluster tool system and a method of controlling the multi cluster tool system that will ameliorate one or more of the current problems associated with known multi cluster tool systems or at least provide the public with a useful alternative.

SUMMARY OF THE INVENTION

In accordance with a first aspect, the present disclosure is directed to a method of controlling a multi cluster tool system, the multi cluster tool system configured to process a semiconductor product, the multi cluster tool system including a plurality of cluster tools arranged adjacent each other, a buffer module positioned between a pair of cluster tools and each cluster tool including a plurality of processing modules and a robot, the method of controlling a multi cluster tool system comprising;
receiving a plurality of system parameters from a user interface, wherein the system parameters correspond to one or more processing steps in a system cycle, wherein the system cycle is a cycle of processing the semiconductor product,
determining a system schedule for defining the system cycle for processing a semiconductor product,
the system schedule providing robot waiting times for each robot of each cluster tool, controlling, via a controller, the operation of each robot of each cluster tool based on the determined schedule.

In an embodiment the method comprises controlling each robot based on the determined system schedule such that each robot in the multi cluster tool system functions in a paced manner, such that each robot acts in a coordinated manner with the other robots in the multi cluster tool system.

In an embodiment the method comprises an additional step of determining a processing cycle for each cluster tool, the processing cycle comprises one or more processing steps and wherein each processing step corresponds to processing at a processing module.

In an embodiment the system cycle comprises a sum of each of the determined processing cycles, and the schedule defines the order of processing cycles to be performed, and wherein the system cycle is assumed to be a one semiconductor product cycle that defines a sequence of processing cycles or processing steps, wherein each processing cycle or processing step is executed once.

In an embodiment the method comprises the additional steps of:
determining a fundamental period for each cluster tool within the multi cluster tool system,
determining a bottleneck cluster tool, wherein the bottleneck cluster tool relates to the cluster tool that has the longest fundamental period,
determining a processing cycle time for at least the bottleneck cluster tool, wherein the processing cycle time is determined based a polynomial algorithm.

In an embodiment the method comprises the additional steps of
comparing the fundamental period of the other cluster tools with the processing cycle time of the bottleneck cluster tool, wherein the processing cycle time relates to the time taken to complete processing in a single cluster tool,
determining a scheduling strategy based on if the fundamental period of the other cluster tools is greater than or less than the determined processing cycle time.

In an embodiment the method comprises the additional steps of
determining a natural workload for each processing step of each processing cycle,
determine a processing cycle time for each cluster tool, wherein the processing cycle time equals the longest natural workload for a processing step associated with a cluster tool,
comparing the processing cycle times of all the cluster tools within the multi cluster tool system,
determining a system cycle time, wherein the system cycle time is equal to or relates to the longest processing cycle.

In an embodiment the method comprises the step of checking if a one semiconductor product optimal schedule exists prior to the step of controlling, the method proceeding to the step of controlling the multi cluster tool system if the one semiconductor product optimal schedule exists, and wherein the system schedule is the optimal one semiconductor schedule.

In an embodiment the system schedule is determined based on a mathematical model of the multi cluster tool system, the mathematical model of the multi cluster tool system being a petri net model,
wherein the mathematical model the multi cluster tool system modelling each processing step within the system cycle, each processing step being modelled to include a plurality of transitions, and;
wherein the system parameters are a time duration associated with each transition of the processing step.

In an embodiment the system parameters comprise one or more of:
a time value for processing a semiconductor product at each processing module in each cluster tool,
an unloading time value for the robot to unload a semiconductor product from a processing module in each cluster tool,
a loading time value for the robot to load a semiconductor product into a processing module in each cluster tool,
a semiconductor product residence time in a processing module of each cluster tool,
a robot moving time, the robot moving time being related to the time for a robot moving from one processing module to an adjacent processing module.

In accordance with a second aspect, the present disclosure is directed to a multi cluster tool system, the multi cluster tool system comprising;
two or more cluster tools being positioned adjacent each other,
wherein each cluster tool comprises a plurality of processing modules,
a buffer module located between two adjacent cluster tools,
a plurality of robots, wherein a single robot is part of a single cluster tool, each robot being configured to load, transfer and unload a semiconductor product to and from each of the plurality of processing modules in each cluster tool, each robot configured to load and unload a semiconductor product into the buffer module,
a user interface in electronic communication with a hardware controller, the user interface configured to allow a user to communicate with the multi cluster tool,
the hardware controller being in electronic communication with each robot within the multi cluster tool system, the controller being configured to execute a method of controlling the multi cluster tool system,
wherein the method of controlling the multi cluster tool system comprising the steps of:
receiving a plurality of system parameters from the user interface, wherein the system parameters correspond to one or more processing steps in a system cycle, wherein the system cycle is a cycle of processing the semiconductor product,
determining a system schedule for defining the system cycle for processing a semiconductor product,
the system schedule providing robot waiting times for each robot of each cluster,
controlling the operation of each robot of each cluster tool based on the determined schedule.

In an embodiment the controller is configured to control each robot based on the determined schedule such that each robot in the multi cluster tool system functions in a paced manner, such that each robot acts in a coordinated manner with the other robots in the multi cluster tool system, and wherein the controller further being configured to determine a processing cycle for each cluster tool, the processing cycle comprises one or more processing steps and wherein each processing step corresponds to processing at a processing module.

In an embodiment the system cycle comprises a sum of each of the determined processing cycles, and the schedule defines the order of processing cycles to be performed, and wherein the system cycle is assumed to be a one semiconductor product cycle that defines a sequence of processing cycles or processing steps, wherein each processing cycle or processing step is executed once.

In an embodiment the controller being configured to:
determine a fundamental period for each cluster tool within the multi cluster tool system,
determine a bottleneck cluster tool, wherein the bottleneck cluster tool relates to the cluster tool that has the longest fundamental period,
determine a processing cycle time for at least the bottleneck cluster tool, wherein the processing cycle time is determined based a polynomial algorithm.

In an embodiment the controller being further configured to:
compare the fundamental period of the other cluster tools with the processing cycle time of the bottleneck cluster tool, wherein the processing cycle time relates to the time taken to complete processing in a single cluster tool,
determine a scheduling strategy based on if the fundamental period of the other cluster tools is greater than or less than the determined processing cycle time,
determine a natural workload for each processing step of each processing cycle,
determine a processing cycle time for each cluster tool, wherein the processing cycle time equals the longest natural workload for a processing step associated with a cluster tool,
compare the processing cycle times of all the cluster tools within the multi cluster tool system, and
determine a system cycle time, wherein the system cycle time is equal to or relates to the longest processing cycle.

In an embodiment the controller being configured to check if a one semiconductor product optimal schedule exists prior to the step of controlling,
the controller configured to control the multi cluster tool system if the one semiconductor product optimal schedule exists, and wherein the system schedule is the optimal one semiconductor,
the controller further configured to output an alarm if a semiconductor product optimal schedule does not exist, the alarm being communicated to the user via the user interface.

In an embodiment the system schedule being determined based on a mathematical model of the multi cluster tool system,
the mathematical model of the multi cluster tool system being a petri net model,
wherein the mathematical model of the multi cluster tool system comprises a model of each processing step within the system cycle, each processing step being modelled to include a plurality of transitions, and;
wherein the system parameters are a time duration associated with each transition of the processing step, and;
wherein the mathematical model being a predetermined mathematical model that is stored in the controller.

In an embodiment the system parameters comprise one or more of:
a time value for processing a semiconductor product at each processing module in each cluster tool,
an unloading time value for the robot to unload a semiconductor product from a processing module in each cluster tool,
a loading time value for the robot to load a semiconductor product into a processing module in each cluster tool, a semiconductor product residence time in a processing module of each cluster tool, a robot moving time, the robot moving time being related to the time for a robot moving from one processing module to another processing module.

In an embodiment the controller comprises:
a processor, a memory unit and a robot interface,
the robot interface configured to communicate with each robot in the multi cluster tool system,
the processor in electronic communication with the memory unit and the robot interface, the memory unit being a non-transitory computer readable medium, the memory unit storing the method of controlling the multi cluster tool system as a set of computer executable instructions, the memory unit further storing the mathematical model of the multi cluster tool system,
the processor being configured to execute the stored instructions and perform the method of controlling a multi cluster tool system and wherein the processor configured to control each robot of the multi cluster tool system based on the method of controlling the multi cluster tool system.

In an embodiment the controller comprises a plurality of robot interfaces, wherein each robot interface corresponds with the robot of a single cluster tool and is configured to communicate only with its corresponding robot, and wherein the controller is configured to control each robot via its corresponding robot interface.

BRIEF DESCRIPTION OF THE DRAWINGS

Embodiments of the multi cluster tool system and method of controlling a multi cluster tool system will now be described, by way of example, with reference to the accompanying drawings in which:

FIG. 6 illustrates a table of time durations associated with transitions and places in a single cluster tool of the multi cluster tool system.

FIG. 7 illustrates steps of an algorithm for determining if a one wafer cyclic schedule with lower bound (OSLB) exists and determining the one wafer cyclic schedule with lower bound (OSLB).

FIG. 9 shows a further embodiment for controlling a multi cluster tool system.

DETAILED DESCRIPTION OF THE PREFERRED EMBODIMENT

The foregoing describes at least a preferred embodiment of a multi cluster tool system, a preferred embodiment of a method of controlling a multi cluster tool system, and modifications, obvious to those skilled in the art, which can be made thereto without departing from the scope of the present disclosure.

Cluster tool apparatuses are a type of integrated equipment that implements semiconductor processing technology. In particular a cluster tool apparatus is a piece of integrated equipment that implements single wafer processing technology. In this disclosure the semiconductor product is a silicon wafer and the present disclosure will refer to a silicon wafer (i.e. a wafer). It should be understood that the cluster tool apparatus may be used to process any other suitable semiconductor product.

Cluster tools can provide a flexible, reconfigurable, and efficient environment, resulting in higher productivity, shorter cycle times, better utilization of space and lower capital expenses.

Therefore cluster tools are increasingly used in a semiconductor processing method, such as a wafer fabrication process. Further multi cluster tool systems are increasingly used in wafer fabrication processes particularly for complex wafer fabrication processes. A multi cluster tool system comprises a plurality of cluster tools being positioned adjacent each other and being connected to each other. Multi cluster tool systems can also provide improved productivity because more wafers can be processed or fabricated in a multi cluster tool system.

Figure 1:
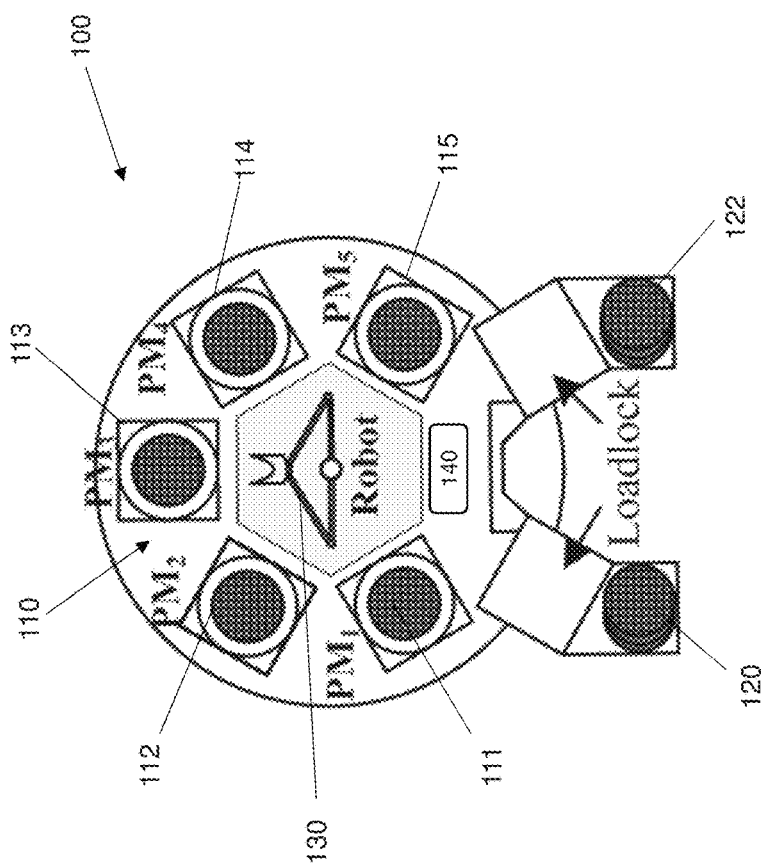
FIG. 1 illustrates a single cluster tool that comprises a plurality of processing modules and a robot.

FIG. 1 shows an embodiment of a single arm cluster tool 100. The cluster tool 100 comprises one or more processing modules 110, a pair of loadlocks 120, 122 and a single arm robot 130. As shown in FIG. 1 the single arm cluster tool 100 comprises five processing modules 111, 112, 113, 114 and 115 (also referred to as 111-115). The processing modules 111-115 are used in processing a raw semiconductor product (i.e. a silicon wafer) utilizing a suitable processing method. The single arm robot 130 comprises a single robotic arm with a single robotic head 132. The robotic head 132 comprises an appropriate tool, such as a pair of jaws, which allow the robotic head 132 to pick up and/or drop off semiconductor products from any one or more of the processing modules 111-115.

In an alternative embodiment the cluster tool may comprise a dual arm robot. A dual arm robot comprises two arms and a two robotic heads. The robotic heads can each pick up and drop off silicon wafers from the processing modules for processing.

A multi cluster tool system comprises a plurality of cluster tools that are connected together. A generalized multi cluster tool system comprises K cluster tools being connected together. A multi cluster tool system comprising K cluster tools is referred to as a K cluster tool. A semiconductor product (i.e. a wafer) undergoes processing in the multi cluster tool system as part of a system cycle. The system cycle comprises processing a wafer in one or more of the cluster tools based on a specified or predefined processing recipe or method. In some processing recipes or methods the wafer can undergo specific processing in a specific cluster tool. The wafer is transferred between the cluster tools of the multi cluster tool system as part of the system cycle.

Figure 2:
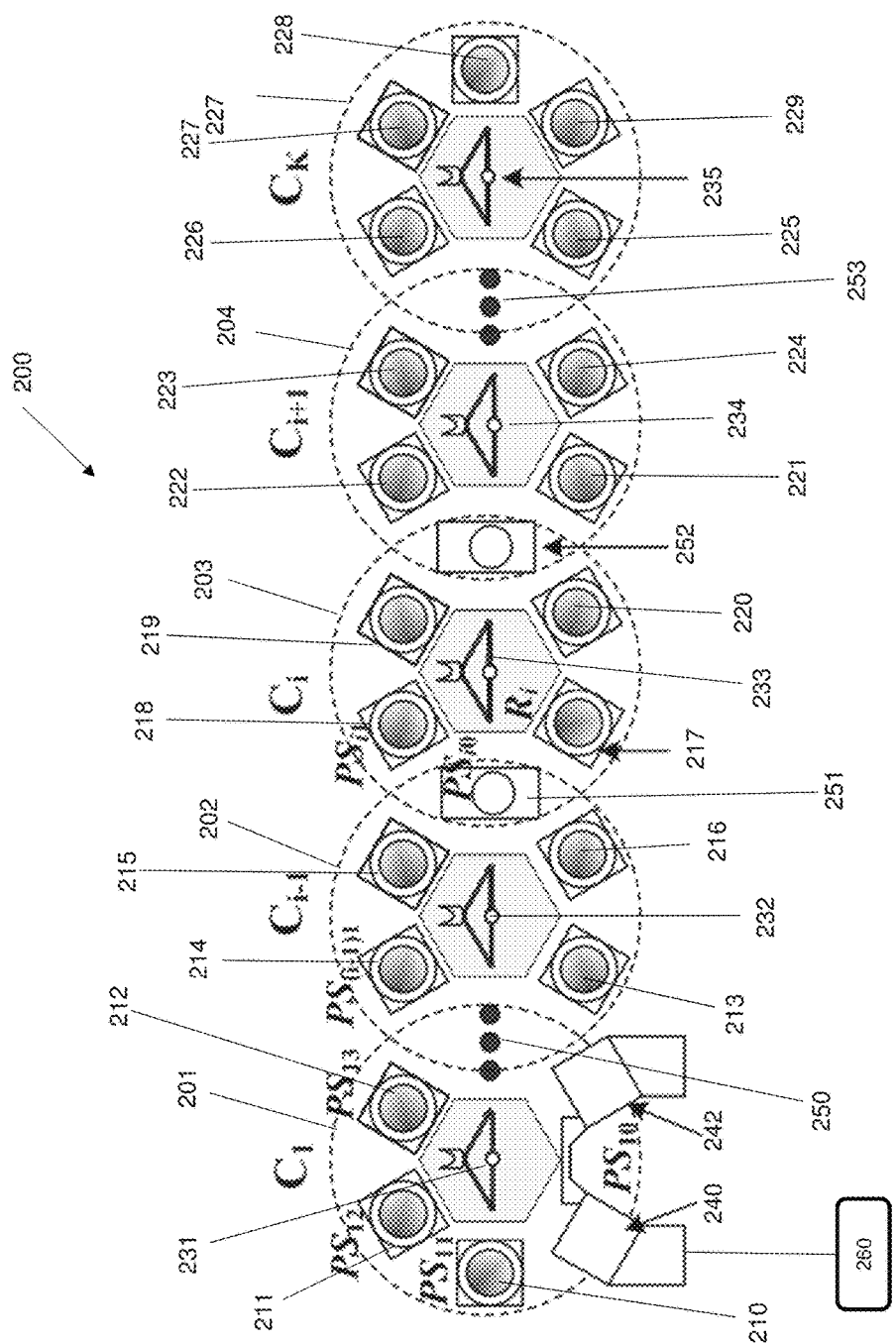
FIG. 2 illustrates a multi cluster tool system that comprises a plurality of single cluster tools arranged adjacent each other and being connected to each other.

FIG. 2 shows an embodiment of a multi cluster tool system 200. The multi cluster tool system 200 comprises five cluster tools 201, 202, 203, 204 and 205 (201-205). Each cluster tool 201-205 may have an identical structure as a cluster tool 100. As shown in FIG. 2, each cluster tool comprises a plurality of processing modules (PM). The first cluster tool 201 comprises three processing modules 210, 211, 212. The second cluster tool 202 comprises four processing modules 213, 214, 215, 216. The third cluster tool 203 comprises four processing modules 217, 218, 219, 220. The fourth cluster tool 204 comprises four processing modules 221, 222, 223, 224. The fifth cluster tool 205 comprises five processing modules 225, 226, 227, 228 and 229.

Each of the processing modules (PM) 210-229 are used in the processing of one or more silicon wafers or other suitable semiconductor products. Each cluster tool 201-205 executes a processing cycle that comprises processing a wafer using one or more of the processing modules (PM) of the specific cluster tool.

The multi cluster tool 200 comprises a plurality of robots. Each robot is associated with a cluster tool. The multi cluster tool 200 comprises five robots 231, 232, 233, 234 and 235. Each robot 231-235 are part of a single cluster tool 201-205. Each robot 231-235 is configured to interact with the processing modules of a single cluster tool, i.e. the cluster tool that the robot is part of. For example the robot 231 is configured to pick up and drop off semiconductor products (i.e. a silicon wafer) from processing modules 210-212.

With continued reference to FIG. 2, the multi cluster tool system 200 comprises a pair of loadlocks 240, 242. The loadlocks 240, 242 are used for loading and unloading raw wafers into the multi cluster tool system 200. A plurality of raw wafers are held in a cassette. Each loadlock 240, 242 is configured to retain a cassette. A cassette with alot of wafers in it automatically dispenses a wafer when actuated by a loadlock 240, 242. In an embodiment one loadlock may provide raw wafers and the other loadlock may receive wafers.

A wafer is transported to an appropriate processing module of the first cluster tool 201 by the robot 231 of the first cluster tool. The wafer can be transported to any of the other processing modules of the first cluster tool 201 based on a predetermined processing method. The wafer can also be transported to processing modules of adjacent cluster tools as required by a particular processing method. A wafer (i.e. semiconductor product) can only be transferred from one cluster tool to an adjacent cluster tool. For example a wafer can be transferred from cluster tool 201 to cluster tool 202. Generally a wafer cannot be transferred from cluster tool 201 directly to cluster tool 203 as they are not adjacent each other. The wafer is returned to one of the loadlocks 240, 242 following processing in the multi cluster tool system 200. Once all the wafers in a cassette have been processed, the cassette is unloaded so that another cassette can be loaded. The order of transporting the wafer to the specific processing modules is dependent on a predetermined processing recipe or method. The loadlocks 240, 242 are advantageous because they allow the multi cluster tool system to operate continuously without interruption.

The multi cluster tool system 200 comprises one or more buffer modules (BM). The embodiment shown in FIG. 2 comprises four buffer modules (BM) 250, 251, 252, 253. For clarity of the figures and ease of understanding only two buffer modules are illustrated. The multi cluster tool system 200 comprises K−1 buffer modules, wherein K=the number of cluster tools. In the illustrated embodiment of FIG. 2, the multi cluster tool system comprises five cluster tools 201-205, therefore the multi cluster tool system 200 comprises four buffer modules 250-253. The buffer modules act as a link between adjacent cluster tools. Each buffer module is positioned between two adjacent cluster tools and connects the two cluster tools.

One buffer module is shared between a pair of cluster tools.

The buffer modules 250-253 each receive a wafer once it has been processed by a specific cluster tool i.e. following a processing cycle the wafer is placed in the buffer module by a robot.

The robot of the adjacent cluster tool picks up the wafer for a second processing cycle. For example the buffer module 250 receives a processed wafer from cluster tool 201 via the robot 231. The robot 232 lifts out the wafer from the buffer module 250 and transfers the wafer to a processing module of cluster tool 202.

The cluster tools, of the multi cluster tool system, are labelled as $C_1$, $C_{i-1}$, $C_i$, $C_{i+1}$, $C_k$ to denote generalized references that can be used to describe a multi cluster tool system that can include any number of cluster tools. The processing modules in the first cluster tool are labelled as $PS_{11}$, $PS_{12}$, $PS_{13}$. With such a notation the first subscript relates to the cluster tool number and the second subscript relates to the number of processing module. The first processing module of cluster tool $C_{i-1}$ may be labelled as $PS_{(i-1)1}$. The loadlock is labelled as $PS_{10}$. This notation is used in the description and used to denote generalized references that can be used to describe a multi cluster tool system that can include multiple processing modules as part of the multi cluster tool system. In this generalized notation a loadlock is labelled as $PS_{10}$, as the loadlock is the beginning of a system cycle. The loadloack is denoted as the start point for processing.

The multi cluster tool system 200 further comprises a user interface 260. The user interface 260 can be located at any suitable location such as adjacent any of the cluster tools 201-205 within the system 200. In the illustrated embodiment the user interface 260 is located adjacent the loadlocks. The user interface 260 preferably comprises an input/output unit (I/O unit) that allows a user to communicate with the multi cluster tool system 200. The I/O unit allows information related to the multi cluster tool system 200 to be communicated to the user or operator of the system 200. The I/O unit also allows a user or operator to input information to assist in operation of the multi cluster tool system 200. The I/O unit is preferably a touch screen.

The multi cluster tool system 200 further comprises a controller 300. The controller 300 is an electronic, hardware controller that is configured to control the operation of the multi cluster tool system 200. The controller 300 controls the robots and may further control operation of one or more processing modules within the multi cluster tool system 200. The controller 300 may a microcontroller that is embedded within the multi cluster tool system 200. Some examples of the hardware controller 300 are Intel 8051 or a Freescale 68HC11 or ARM Cortex-M or any other suitable microcontroller.

Figure 3:
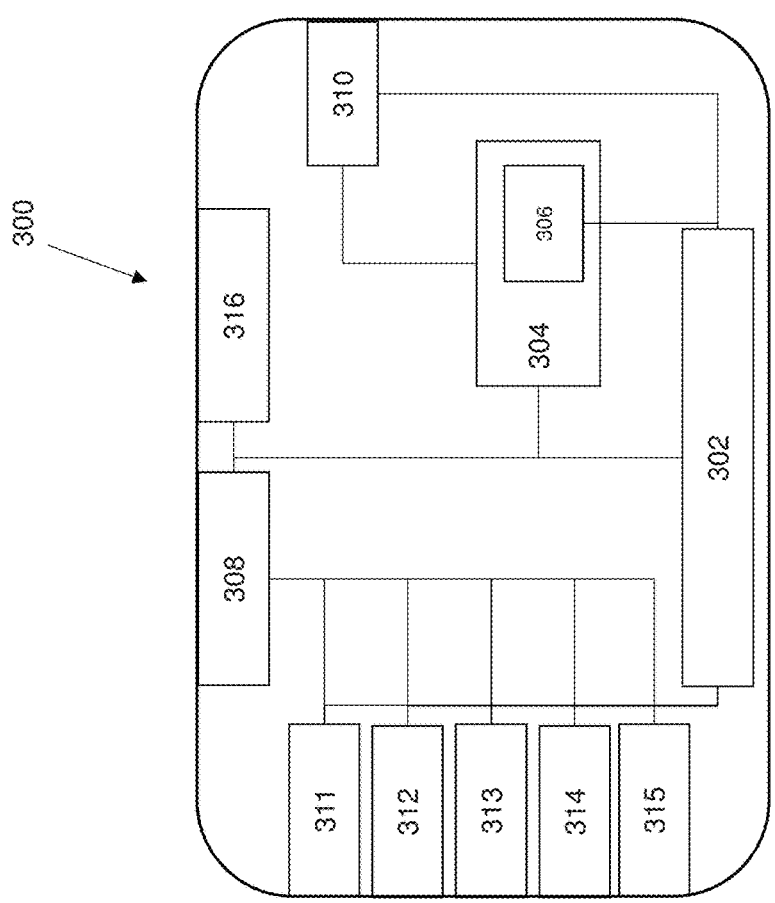
FIG. 3 illustrates an embodiment of a controller of the multi cluster tool system.

FIG. 3 shows an embodiment of the controller 300. Referring to FIG. 3, the controller 300 comprises a processor 302. The processor 302 is a hardware processor that is configured execute stored executable computer readable instructions and control the operation of the multi cluster tool system 200. The processor 302 may be any suitable hardware processor such as for example an Intel i5 processor or an AMD processor or a Celeron processor or any other suitable processor. The processor 302 is further configured to interact with the other components of the controller 300.

The controller 300 further comprises a memory unit 304. The memory unit 304 is in electronic communication with the processor 302. The memory unit can be any suitable read and write memory such as ROM, RAM or Flash Memory. The memory unit 304 stores one or more sets of computer readable instructions that are executable by the processor 302. The computer readable instructions may define an algorithm that is used to control the operation of the multi cluster tool system 200.

The controller 300 may further include a commercial solver 306 that is stored in the memory unit 304 as a set of computer readable and executable instructions. The commercial solver 306 can be executed by the processor 302 to solve a linear program (i.e. an algorithm) to generate an optimal schedule and determine if an optimal schedule exists for the multi cluster tool system 200. The commercial solver 306 can yield robot waiting times as part of determining an optimal schedule when executed by the processor 302. The commercial solver 306 can be any suitable open source such as for example ADMB, LINCOA, OpenMDAO. Alternatively the commercial solver 303 may a proprietary software such as for example AMPL, IOSO, Matlab or NMath. In a further alternative embodiment the commercial solver 306 may be a separate hardware module or block that is in electronic communication with and controllable by the processor 302.

The controller 300 comprises a wireless communications module 308. The wireless communications module 308 is configured to allow the controller 300 to transmit information wirelessly. The wireless module 308 can be operated by the processor 302. For example the wireless module 308 allows the processor 302 (i.e. the controller) to wirelessly control each cluster tool or at least control the robot of each cluster tool. The wireless module 308 allows wireless information transfer via any suitable information transfer protocol.

The controller 300 further comprises an interface module 310. The interface module 310 is configured to interact with and communicate with user interface 260. The interface module 310 is electrically coupled to the memory unit 304 and the processor 302 such that information from the user interface can be communicated to the memory unit 304 and/or the processor 302. The processor 302 can also output information such as visual information or audible information or an alarm to the user interface 260 via the interface module 310.

The controller 300 further comprises one or more robot interfaces. In the embodiment illustrated in FIG. 3 the controller 300 comprises a five robot interfaces 311, 312, 313, 314 and 315 (311-315). Each robot interface 311-315 corresponds to a robot 231-235 of each cluster tool 201-205. Each robot interface 311-315 is configured to communicate with a single robot 231-235. The robot interface 311-315 links the controller 300, and in particular the processor 302 with each robot 231-235, of each cluster tool 201-205. The processor 302 controls each robot interface to generate an output in a suitable format that can be read by a robot to cause an actuation of that robot. Each robot interface 311-315 is electrically coupled to the wireless module 308. Each robot interface 311-315 is configured to provide control information to the wireless module 308 which then transmitted to a robot corresponding to a robot interface 311-315. The processor 302 is configured to control the operation of the robot interfaces 311-315 and the wireless module 308. The processor 302 is configured to control the robot interface 311-315 to generate appropriate control information of signal to control a corresponding robot. The processor 302 is further configured to control the wireless module 308 that is configured to activate the wireless module 308 to transmit the control information to the specific robot. The control information can be a schedule that includes at least robot waiting times. The schedule can also include other information such as order of processing and the movements required by the robot as part of a system cycle. The embodiment shown in FIG. 3 is advantageous because each robot can be controlled in real time with minimal delay.

In an alternative embodiment the controller 300 may comprise a single robot interface that communicates with any robot via the wireless module. The single robot interface generates control information and identifies the specific robot that requires control.

The controller 300 may further comprise one or more processing module interface 316. In the embodiment of shown in FIG. 3, the controller comprises a single processing module interface 316 that is configured to communicate with the processing modules of the multi cluster tool system 200. The processing module interface 316 is electrically coupled to the processor 302 and the wireless module 308. The operation of the processing modules is controlled by the processing module interface 316. Alternatively each processing module may include a local memory unit that is configured to store a control scheme for each processing module. The controller 300 can transmit a control scheme such as a schedule for a system cycle to the local memory unit of the processing module for execution by the processing module.

A multi cluster tool system and its function can be defined as a process dominated (PD) or a transport dominated (TD) system. In a process dominated (PD) multi cluster tool system is one whose bottleneck cluster tool operates in a process bound region. A transport dominated system is one whose bottleneck cluster tool operates in a transport bound region. The multi cluster tool system 200 is modelled as a transport dominated (TD) system, and functions as a TD system. The multi cluster tool system 200 comprises a mathematical model that is stored in the controller 300. In particular the mathematical model of the multi cluster tool system 200 is stored on the memory unit 304. The processor 302 is configured to receive a plurality of system parameters from a user via the user interface 260 and the interface module 310. The system parameters can be time units for various actions in the system cycle. The processor 302 is further configured to determine a schedule for performing the system cycle utilizing the one or more cluster tools 201-205 and robots 231-235. The processor 302 is configured to determine a system schedule that defines the system cycle, wherein the system schedule provides robot waiting times for each robot of each cluster tool. The processor 302 controls the operation of each robot 231-235 based on the robot waiting times. As part of determining the system schedule the processor 302 is further configured to determine if an optimal schedule is possible or not, and if not then an alarm is raised via the user interface 260. The controller 300 is configured to control each robot 231-235 based on the determined system schedule such that each robot 231-235 functions in a paced manner, such that each robot 231-235 acts in a coordinated manner with the other robots in the multi cluster tool system 200. The controller 300 is further configured to determine a processing cycle for each cluster tool, wherein the processing cycle comprises one or more processing steps that corresponds to processing at a processing module.

The multi cluster tool system 200 is modelled using a mathematical model. The mathematical model is a Petri Net model. Petri Nets are recognized as an effective tool for modelling, analysis, and control of manufacturing systems. A Petri Net is used since a Petri Net can deal with concurrent activities, and hence it is the most appropriate model to use to model behavior of the multi cluster tool system 200. The Petri Net model is useful at modelling behavior of resource allocation. The Petri Net model is a finite capacity Petri Net model. The Petri Net model is a resource oriented Petri Net that is extended to model a K cluster tool system. The Petri Net is used to model the activity of each cluster tool 201-205 within the multi cluster tool system 200, and further configured to model the interaction activity between two cluster tools 201-205 and a buffer module 250-253.

To model the multi cluster tool system the following assumptions are relied upon: 1) only one PM is configured for each step within the system cycle; 2) each time, only one wafer can be processed in a PM; 3) only one type of wafer with an identical processing route is processed and a wafer visits a PM only once except when entering a BM (buffer module) twice; 4) a BM has no processing function and its capacity is one; and 5) the activity time is deterministic. To model the system 200 let $\mathbb{N}_K=\{1, 2, \ldots, K\}$ and $\Omega_K = \mathbb{N}_K \cup \{0\}$, $C_i$, $i \in \mathbb{N}_K$, denote the i-th tool with $C_1$ being the "head" tool that has two loadlocks and $C_K$ the "tail" one, and $R_i$ the robot in $C_i$. A BM and the loadlocks are treated as a processing step (PS) with processing time being zero. A BM connecting $C_i$ and $C_{i+1}$, $i \in \mathbb{N}_{K-1}$, is numbered as Steps b[i] and 0 for $C_i$ and $C_{i+1}$, respectively. The loadlocks are numbered as Step 0 for $C_1$. Let n[i] be the index for the last step in $C_i$ and $PS_{ij}$ denote Step j, $j \in \Omega_{n[i]}$. Then, these n[i]+1 steps in $C_i$ are denoted as $PS_{i0}$, $PS_{i1}$, ..., $PS_{i(b[i])}$, ..., $PS_{i(n[i])}$, respectively. In this way, the route of a wafer is denoted as: $PS_{10} \to PS_{11} \to \ldots \to PS_{1(b[1])}$ $(PS_{20}) \to PS_{21} \geq \ldots \to PS_{2(b[2])}$ $(PS_{30}) \to \ldots \to PS_{(K-1)(b[K-1])}$ $(PS_{K0}) \to PS_{K1} \to \ldots \to PSK_{(n[K])} \to PS_{K0}$ $(PS_{(K-1)(b[K-1])}) \ldots \to PS_{20}$ $(PS_{1(b[1])}) \to PS_{1(b[1]+1)} \to \ldots \to PS_{1(n[1])} \to PS_{10}$.

The resource oriented Petri Net used to model a K cluster tool system is defined as PN=(P, T, I, O, M, $\mathcal{K}$), where $P=\{p_1, p_2, \ldots, p_m\}$ and $T=\{t_1, t_2, \ldots, t_n\}$ are finite sets of places and transitions with $P \cap T = \emptyset$ and $P \cup T \neq \emptyset$; I and O are input and out functions; M is a marking giving the number of tokens in P with $M_0$ being the initial one; and $\mathcal{K}$ is a capacity function with $\mathcal{K}(p)$ representing the largest number of tokens that p can hold at a time. The preset/postset of transition t is the set of the input/output places to/from t, i.e., $^\bullet t = \{p: p \in P \text{ and } I(p, t) > 0\}$ and $t^\bullet = \{p: p \in P \text{ and } O(p, t) > 0\}$. Similarly, p's preset and postset $^\bullet p = \{t \in T: O(p, t) > 0\}$ and $p^\bullet = \{t \in T: I(p, t) > 0\}$. The transition enabling and firing rules are defined as follows.

Definition 2.1: In a finite capacity PN, a transition $t \in T$ is enabled if $\forall p \in P$, $$M(p) \geq I(p, t) \tag{2.1}$$

and $K(p) \geq M(p) - I(p, t) + O(p, t) \tag{2.2}$

Firing an enabled t at marking M yields $$M'(p) = M(p) - I(p, t) + O(p, t) \tag{2.3}$$

Definition 2.1 implies that t is enabled and can fire if there are enough tokens in $\forall p \in {}^\bullet t$ and enough free spaces in $\forall p \in t^\bullet$. Conditions (2.1) and (2.2) say that t is process and resource-enabled, respectively. Thus, t is enabled only if it is both process and resource-enabled.

To schedule a K cluster tool (a multi cluster tool system), the key is to coordinate the activities of the plurality of robots in accessing shared BMs (i.e. buffer modules). The determined system schedule is configured to coordinate the activities of the robots 231-235 such that the cluster tools act in a paced manner. If each individual tool and the operation for accessing the BMs are modeled, the dynamic behavior of the overall system (i.e. multi cluster tool system) is considered to be well described.

A Petri Net model for single arm cluster tools are well developed. A Petri Net model for operating a buffer module (BM) is also known.

Figure 4:
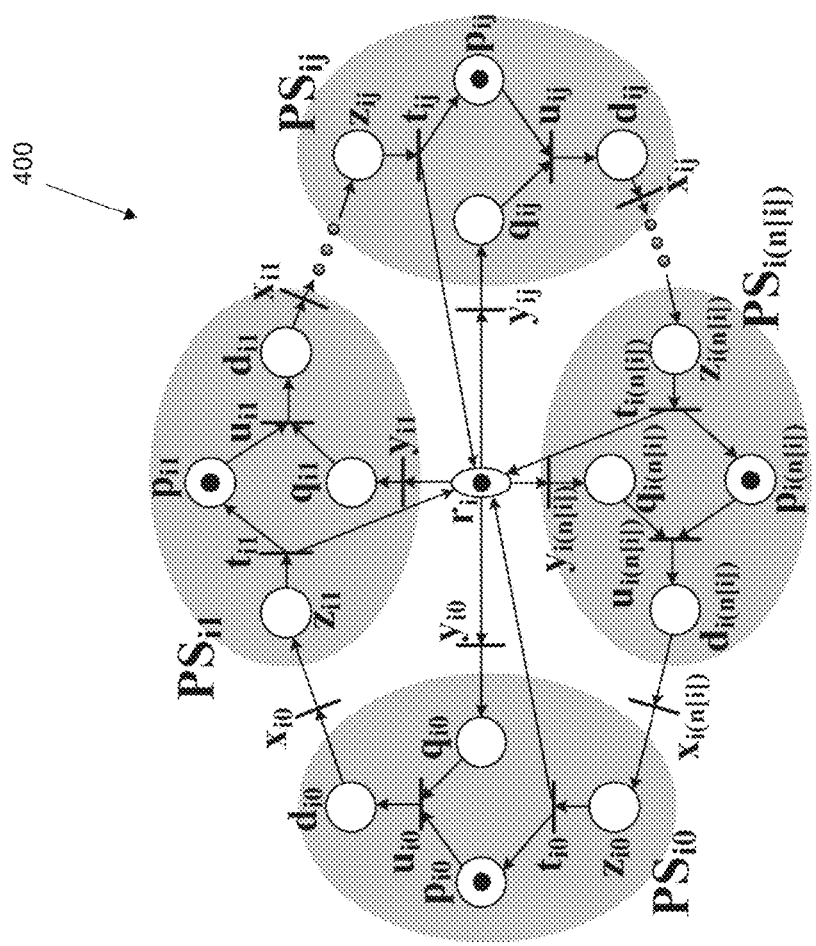
FIG. 4 shows a Petri Net model of a single cluster tool that is part of the multi cluster tool system of FIG. 2.

FIG. 4 shows a Petri Net model 400 for an individual cluster tool. This model 400 is used to model each cluster tool 201-205 of the multi cluster tool system 200. The PM for Step j, $j \in \Omega_{n[i]}$, in $C_i$, $i \in \mathbb{N}_K$, is modeled by timed place $p_{ij}$. A robot waiting time plays a significant role in scheduling cluster tools. Timed place $q_{ij}$ models $R_i$'s waiting before unloading a wafer (token) from $p_{ij}$. Non-timed places $z_{ij}$ and $d_{ij}$ model that $R_i$ holds a wafer for dropping into $p_{ij}$ and moving to Step j+1 (or Step 0 if j=n[i]), respectively. This results in the expression $\mathcal{K}(p_{ij}) = \mathcal{K}(q_{ij}) = \mathcal{K}(z_{ij}) = \mathcal{K}(d_{ij}) = 1$ excepts $\mathcal{K}(p_{10}) = \infty$ indicating that the loadlocks can hold all the wafer in process. Pictorially, all these places are denoted as $\bigcirc$, in FIG. 4. Timed transitions $t_{ij}$ and $u_{ij}$ model $R_i$'s loading a wafer into $p_{ij}$ and unloading a wafer from $p_{ij}$, respectively. Pictorially, they are denoted as ▬. Then, by adding arcs $(z_{ij}, t_{ij})$, $(t_{ij}, p_{ij})$, $(p_{ij}, u_{ij})$, $(q_{ij}, u_{ij})$, and $(u_{ij}, d_{ij})$, the Petri Net model for step j in $C_i$ (i.e. in a cluster tool $C_i$) is formed as shown in FIG. 4.

With the Petri Net model for a step, the wafer flow for $C_i$ is modeled as follows. Robot $R_i$ is modeled by place $r_i$ with $\mathcal{K}(r_i) = 1$ and denoted by $\bigcirc$. A token in it implies that the robot arm is available. $R_i$'s moving from Steps j to j+1, $j \in \Omega_{n[i]-1}$, with a wafer held is modeled by transition $x_{ij}$ together with arcs $(d_{ij}, x_{ij})$ and $(x_{ij}, z_{i(+1)})$, and $x_{i(n[i])}$ for moving from Steps n[i] to 0. Transition $y_{ij}$ together with arcs $(r_i, y_{ij})$ and $(y_{ij}, q_{ij})$ models $R_i$'s moving from any Steps m to j, m, $j \in \Omega_{n[i]}$, without holding a wafer. At last, arc $(t_{ij}, r_i)$ is used to represent that, by firing $t_{ij}$, the robot arm is released. In this way, the Petri Net model for a single-arm $C_i$ (i.e. a single arm cluster tool e.g. 201-205) is obtained as shown in FIG. 4.

A buffer module 250-253 is configured to be positioned in between two adjacent cluster tools and link the two cluster tools. Therefore stated another way, since the BM (i.e. buffer module) linking $C_i$ and $C_{i+1}$, $i \in \mathbb{N}_{K-1}$, is treated as Step b[i] for $C_i$ and Step 0 for $C_{i+1}$, respectively, it is modeled by places $P_{i(b[i])}$ and $p_{(i+1)0}$. When it refers to $C_i$, $P_{i(b[i])}$ is used and while the model refers to $C_{i+1}$, the notation $p_{(i+1)0}$ is used. $C_i$ and $C_{i+1}$ refer to two adjacent cluster tools such as cluster tools 201-205.

Figure 5:
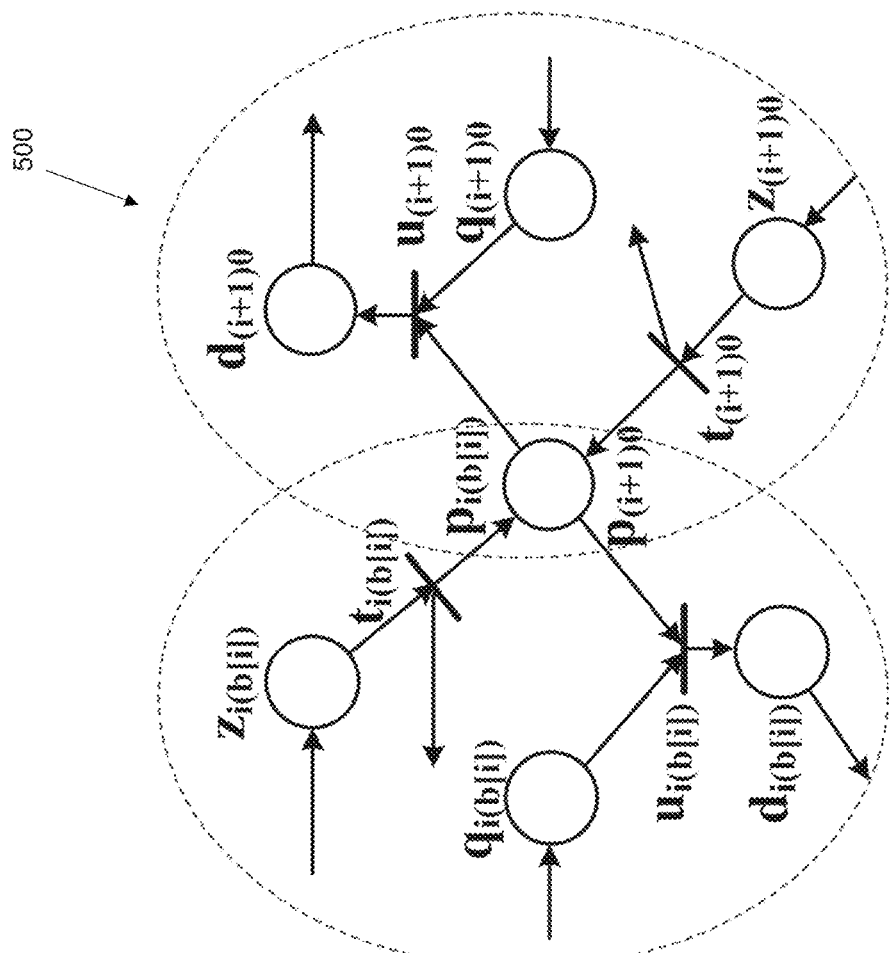
FIG. 5 shows a Petri Net model of a buffer module and interaction between two adjacent cluster tools and the buffer module.

Then, Step b[i] for $C_i$ is modeled by $Z_{i(b[i])}$, $t_{i(b[i])}$, $q_{i(b[i])}$, $P_{i(b[i])}$, $U_{i(b[i])}$, and $d_{i(b[i])}$ together with arcs $(Z_{i(b[i])}, t_{i(b[i])})$, $(t_{i(b[i])}, p_{i(b[i])})$, $(P_{i(b[i])}, U_{i(b[i])})$, $(g_{i(b[i])}, U_{i(b[i])})$, and $(u_{i(b[i])}, d_{i(b[i])})$. Step 0 for $C_{i+1}$ is modeled by $z_{(i+1)0}$, $t_{(i+1)0}$, $P_{(i+1)0}$, $q_{(i+1)0}$, $u_{(i+1)0}$, and $d_{(i+1)0}$ together with arcs $(z_{(i+1)0}, t_{(i+1)0}, (t_{(i+1)0}, P_{(i+1)0})$, $(p_{(i+1)0}, u_{(i+1)0})$, $(q_{(i+1)0}, u_{(i+1)0})$, and $(u_{(i+1)0}, d_{(i+1)0})$, as shown in FIG. 5. FIG. 5 shows a Petri Net model 500 of the buffer module (BM) and interaction with the BM by two adjacent cluster tools $C_i$ and $C_{i+1}$. The Petri Net model is used to schedule a K cluster tool system whose bottleneck tool is transport bound (TB).

Using the mathematical models 400, 500 in FIGS. 4 and 5, a basic activity is defined as $A_{ij} = \langle y_{ij} \to u_{ij} \to x_{ij} \to t_{i(j+1)}$ (or $t_{i0}$ if j=n[i])>, $i \in \mathbb{N}_K$ and $j \in \Omega_n[i]$. Note that if $t_{ij}$ is followed by $A_{ij}$, $R_i$ is already at Step j. In this case, $y_{ij}$ implies that the robot moves from Step j to j, i.e., it takes no action. Then, without considering robot waiting, a schedule strategy for $C_i$ can be described as $\eta_i = (A_{i(i_0)} A_{i(i_1)} \ldots A_{i(i_{n[i]})})$, where $i_0, i_1, \ldots,$ and $i_{n[i]}$ represent a permutation of $\{0, 1, 2, \ldots, n[i]\}$ in $C_i$. In the presented control method and mathematical model it is assumed, $A_{i(i_0)}$ is set to be $A_{i_0}$ unless otherwise specified, which means that $\eta_i$ begins with unloading a wafer from Step 0.

In order to determine the existence of a one wafer cyclic schedule with a lower bound of cycle time (OSLB) for a transport dominated (TD) single arm K cluster tool system, a bottleneck tool is examined first. The OSLB corresponds to an optimal schedule for the multi cluster tool system 200.

Firstly, let $C_{i_1}$ be such a tool with fundamental period (FP) being $FP_{i_1}$ and it must be TB. A polynomial algorithm is developed to find an optimal one wafer cyclic schedule $O^2CS$ for a TB single arm cluster tool. The polynomial algorithm may be a well known polynomial algorithm such as defined in Dawande et al 2002. The algorithm 700 will be described later with respect to FIG. 7.

The polynomial algorithm is used to find an $O^2CS$ for $C_{i_1}$ with processing cycle time $\Pi_{i_1}$. Once a $O^2CS$ is obtained, an activity sequence is determined for $C_{i_1}$. The fundamental period (FP) for each $C_i$, $i \in \mathbb{N}_K \setminus \{i_1\}$ is calculated. It is assumed that Assume that $C_{i_2}$ with $i_2 \neq i_1$ has the largest $FP_{i_2}$ in $C_i$, $i \in \mathbb{N}_K \setminus \{i_1\}$. There are three different cases:

Case 1): $FP_{i_2} \leq \Pi_{i_1}$, then a backward strategy can be applied to each $C_i$, $i \in \mathbb{N}_K \setminus \{i_1\}$, without deteriorating the performance;

Case 2): $FP_{i_2} > \Pi_{i_1}$ and $C_{i_2}$ is PB, then a backward strategy can be applied to each $C_i$, $i \in \mathbb{N}_K \setminus \{i_1\}$, without deteriorating the performance; and, Case 3): $FP_{i_2} > \Pi_{i_1}$ and $C_{i_2}$ is TB.

For Case 3, to find an $O^2CS$ for $C_{i_2}$ and its cycle time $\Pi_{i_2}$, and $C_{i_3}$ such that it has the largest $FP_{i_3}$ in $C_i$, $i \in \mathbb{N}_K \setminus \{i_1, i_2\}$. Continuing this process, finally, the strategy and activity sequence can be determined, for each individual tool $C_i$, which is denoted by $\eta_i$.

A one-wafer cycle is a sequence of activities consisting of every activity only once and during which exactly one wafer is loaded into and unloaded from the cluster tool. The one-wafer cycle time (or simply cycle time) is the minimum time required to complete the one-wafer cycle. In a schedule $\eta_i$, an activity chain is a sequence of activities with consecutively increasing order indexes appeared, not necessary adjacently. Take $\eta_i = (A_{i0}A_{i4}A_{i2}A_{i3}A_{i1})$ as an example, $A_{i0}$ and $A_{i1}$ have the indexes 0 and 1 that are in a consecutively increasing order although they are separated by $A_{i4}A_{i2}A_{i3}$. Therefore, $A_{i0}$ and $A_{i1}$ form an activity chain. Also, $A_{i2}A_{i3}$ is an activity chain, and $A_{i4}$ alone forms another activity chain. Hence, there are three activity chains in $\eta_i$. In each activity chain, only one wafer should be in processing during the whole cycle. Hence, given a scheduling strategy $\eta_i$ for $C_i$, $i \in \mathbb{N}_K$, with a type of tokens $V_0$ representing a virtual wafer, the initial marking $M_0$ can be set as follows.

For $C_i$, $i \in \mathbb{N}_K$, let D be the set of indexes of an activity chain in $\eta_i$, and for each D, let $m = \text{Min}\{D\}$. Then, set $M_0(p_{im}) = 1$, $m \in D \setminus \{0\}$, and $M_0(p_{ij}) = 0$, $j \in D \setminus \{0, m\}$; $M_0(p_{10}) = n$ to represent that there are always wafers to be processed in the loadlocks; $M_0(z_{ij}) = M_0(d_{ij}) = M_0(r_i) = 0$, $j \in \Omega_{n[i]}$; and $M_0(q_{ij}) = 0$, $j \in \mathbb{N}_{n[i]}$. At last, set $M_0(q_{i0}) = 1$, implying that $R_i$ is waiting at $PS_{i0}$ for unloading a wafer there. It should be pointed out that at $M_0$, it is assumed that a token in $p_{i(b[i])}$, $i \in \mathbb{N}_{K-1}$, enables $u_{i(b[i])}$ but not $u_{(i+1)0}$. Take $\eta_1 = (A_{10}A_{11}A_{12}A_{15}A_{13}A_{14})$ as an example, there are two activity chains: 1) $A_{10}A_{11}A_{12}A_{13}A_{14}$; and 2) $A_{15}$. For Chain 1, $D = \{0, 1, 2, 3, 4\}$, the minimal one is 0. Thus, set $M_0(p_{10}) = n$, and $M_0(p_{11}) = M_0(p_{12}) = M_0(p_{13}) = M_0(P_{14}) = 0$; For Chain 2, $D = \{5\}$, set $M_0(p_{15}) = 1$. Then, set $M_0(z_{1j}) = M_0(d_{1j}) = M_0(r_1) = 0$, $j \in \Omega_{n[1]}$; $M_0(q_{1j}) = 0$, $j \in \mathbb{N}_{n[1]}$; and $M_0(q_{10}) = 1$.

In the Petri Net model for the BM (i.e. buffer module) as shown in FIG. 5, $p_{i(b[i])}$ ($P_{(i+1)0}$) has two output transitions $U_{i(b[i])}$ and $u_{(i+1)0}$. However, according to the wafer processing route, a token entering $p_{i(b[i])}$ by firing $t_{i(b[i])}$ enables $u_{(i+1)0}$, while the one entering $p_{i(b[i])}$ by firing $t_{(i+1)0}$ enables $U_{i(b[i])}$. At $M_0$, the only enabled transition is $u_{10}$. For $C_1$, after $u_{10}$ fires, $R_1$ may perform task sequence: $<x_{10} \to t_{11} \to y_{10} \to u_{10} \to x_{10}>$ to load a wafer into $PS_{11}$ again such that $M_1$ is reached. At $M_1$, if $PS_{11}$ is not a BM, then $M_1(p_{11}) = 1$, i.e., $t_{11}$ is not resource-enabled, leading to a deadlock. Such a marking can occur for the other individual tools. To avoid deadlock, a control policy is posed on the Petri Net model. Transition t is said to be controlled if its firing is determined by a control policy though it is both process and resource-enabled. For the PN here, $y_{ij}$, $i \in \mathbb{N}_K$ and $j \in \Omega_{n[i]}$, are controlled ones.

The control policy is defined as follows. For the PN of $C_i$, $i \in \mathbb{N}_K$, given a strategy $\eta_i = (A_{i(i_0)} A_{i(i_1)} \ldots A_{i(i_{n[i]})}$, at marking M, $y_{i(i_m)}$, $m \in _n[i]$, is said to be control-enabled if $t_{i[(i_{m-1})+1]}$ (if $i_{m-1}$ is $n[i]$, $(i_{m-1})+1$ should be replaced by 0) has just fired; $y_{i(i_0)}$ ($y_{i0}$) is said to be control-enabled if $t_{i[(i_{n[i]})+1]}$ (if $i_{n[i]}$ is $n[i]$, $(i_{n[i]})+1$ should be replaced by 0) has just fired. For $C_1$, at $M_0$, the only enabled transition is $u_{10}$. After $u_{10}$ fires, $R_1$ performs task sequence $(x_{10} \to t_{11} \to y_{1(1_1)} \to u_{1(1_1)} \to x_{1(1_1)} \to t_{1((1_1)+1)} \to y_{1(1_2)} \to u_{1(1_2)} \to \ldots \to t_{1[(1_{n[1]})+1]} \to y_{1(1_0)}$ $(y_{10}) \to u_{10}>$ such that a cycle is completed and there is no deadlock. Similarly, by the above definition, for $C_i$, $i \in \mathbb{N}K \setminus \{1\}$, it can be verified to be deadlock-free. In this way, the PN model is made deadlock-free.

Details of how the activity time is modelled will now be described. The following description is a description of a method for modelling activity time. In the Petri Net models of FIGS. 4 and 5, both transitions and places are associated with time. If time $\zeta$ is associated with transition t, firing t takes $\zeta$ time units. If time $\zeta$ is associated with place p, a token in p can enable its output transition only after it stays there for $\zeta$ time units.

The time taken for $R_i$, $i \in \mathbb{N}_K$, to unload/load a wafer from/into a PM, BM, and loadlock is assumed to be identical and denoted by $\lambda_i$. Similarly, the time taken for $R_i$ to move from Steps m to j, $m \neq j$, is identical regardless of whether it carries a wafer or not, and it is denoted by $\mu_i$. If the activity sequence is $A_{i(j-1)}A_{ij}/A_{i(n[i])}A_{i0}$, after loading a wafer into $p_{ij}/p_{i0}$, $R_i$ waits at $p_{ij}/p_{i0}$ for some time, and then it unloads a wafer from $p_{ij}/p_{i0}$. In this case, $y_{ij}/y_{i0}$ represents that $R_i$ moves from Steps j/0 to j/0 and takes no time. The time taken for processing a wafer in a PM/BM/loadlock at $PS_{ij}$ is $\alpha_{ij}$, $i \in \mathbb{N}_K$ and $j \in \Omega_{n[i]}$. However, for a BM and loadlock, $\alpha_{ij} = 0$. $\omega_{ij}$, $i \in \mathbb{N}_K$ and $j \in \Omega_{n[i]}$, is used to denote $R_i$'s waiting time in $q_{ij}$, and $\tau_{ij}$ the wafer sojourn time (i.e. wafer processing time) in a PM/BM/loadlock. The time taken for different actions is summarized in the table 600 of FIG. 6.

The following is a description of modelling the dynamic behavior of individual cluster tools in a multi cluster tool system. Given a scheduling strategy $\eta_i = (A_{i(i_0)}A_{i(i_1)} \ldots A_{i(i_{n[i]})}$ for $C_i$, it follows that a wafer processing cycle at $PS_{ij}$ is formed by the activity sequence from $A_{ij}$ to $A_{i(j-1)}$, or ($A_{ij} A_{ij_1} A_{ij_2} \ldots A_{ij_m} A_{i(j-1)}$), where $(j_1, j_2, \ldots j_m)$ are the indexes of activities between j and j−1 under $\eta_i$. For example, in $\eta_i = (A_{i0}A_{i4}A_{i2}A_{i3}A_{i1})$, $A_{i1}A_{i0}$ forms such a cycle at $PS_{i1}$, while $A_{i2}A_{i3}A_{i1}$ forms a cycle at $PS_{i2}$. All activities in $\eta_i$ should be performed by $R_i$. In this mathematical model let $IA(PS_{ij})$ denote the sets of step indexes that are included in the activities performed for completing a wafer at $PS_{ij}$ and $IA(R_i)$ the sets of step indexes that are included in the activities performed in an $R_i$ cycle, respectively, i.e., $IA(PS_{ij}) = \{j, j_1, j_2, \ldots j_m, j-1\}$ and $IA(R_i) = \{0, i_1, i_2, \ldots i_{n[i]}\}$. Let $|IA(PS_{ij})|$ and $|IA(R_i)|$ be the cardinality of $IA(PS_{ij})$ and IA($R_i$). Define $\Lambda_i^P = \{j|(A_{i(j-1)}A_{ij}) \not\subseteq \eta_i, j \in \mathbb{N}_{n[i]}\} \cup \{0|(A_{i(n[i])}A_{i0}) \not\subseteq \eta_i\}$ and $\Lambda_i^R = \{j|(A_{i(j-1)}A_{ij}) \subseteq \eta_i, j \in \mathbb{N}_{n[i]}\} \cup \{0|A_{i(n[i])}A_{i0}) \subseteq \eta_i\}$ ... Note that for $\eta_i = (A_{i0} A_{ij_1} A_{ij_2} \ldots A_{ij_m} A_{i(n[i])})$, $0 \in \Lambda_i^R$, since in this case the robot schedule can be equivalently denoted as $\eta_i = (A_{ij_1} A_{ij_2} \ldots A_{ij_m} A_{i(n[i])} A_{i0})$. If an $i \in \Lambda_i^P$, after the robot loads a wafer into Step i, it should go to another step for unloading a wafer. By $j \in \Lambda_i^R$, it represents the fact that $R_i$ unloads a wafer from $p_{i(j-1)}$, loads it into $p_{ij}$, and waits there for the wafer to be completed. Such a process is called full waiting at $PS_{ij}$. Thus, $\Lambda_i^R$ presents the set of steps at which a full waiting occurs, while $\Lambda_i^P$ presents the set of steps at which a partial waiting occurs.

The time taken for a wafer processing cycle at (PM) $PS_{ij}$, $j \in \Omega_{n[i]}$, in $C_i$, $i \in \mathbb{N}_K$, and it is denoted by $\theta_{ij}$. Let $\phi_1$ and $\phi_1$ be the time when $t_{i(b[i])}$ and $t_{i0}$ finish their firing, respectively. After the firing of $t_{i(b[i])}$ and $t_{i0}$, $u_{(i+1)0}$ and $U_{(i-1)(b[i-1])}$ can fire immediately. Then, after some time, $t_{(i+1)0}$ and $t_{(i-1)(b[i-1])}$ fire at $\phi_2$ and $q_2$, respectively. Define $\alpha_{i(b[i])}^* = \phi_2 - \phi_1$, $i \in \mathbb{N}_{K-1}$ and $\alpha_{i0}^* = \phi_2 - \phi_1$, $i \in \mathbb{N}_K \setminus \{1\}$, as the virtual wafer processing time at $PS_{i(b[i])}$ and $PS_{i0}$, respectively. Note that for the loadlocks, after $R_1$ loads a wafer into it, $R_1$ can unload a wafer from it immediately. Thus, $\alpha_{i0}^* = 0$.

Furthermore, a function $\gamma^1_{ij}$, $j \in \Omega_{n[i]}$, is defined as follows.

$$\gamma^1_{ij} = \begin{cases} \alpha_{ij}, & \text{if } j \neq b[i], 0 \\ \alpha^*_{ij}, & \text{if } j = b[i], 0 \end{cases} \quad (3.1)$$

Based on the above function the time taken for a wafer at a processing module (PM) $PS_{ij}$ can be analyzed. If $|IA(PS_{ij})| = 2$, then $IA(PS_{ij}) = \{j, j-1\}$, $j \in \mathbb{N}_{n[i]}$, or $IA(PS_{i0}) = \{0, n[i]\}$. In this case, to complete a wafer at $PS_{ij}$, $j \in \mathbb{N}_{n[i]}$, the following task sequence should be executed: (firing $u_{ij}(\lambda_i) \to x_{ij}(\mu_i) \to t_{i(j+1)}(\lambda_i) \to y_{i(j-1)}(\mu_i) \to R_i$ waiting in $q_{i(j-1)}$ ($\omega_{i(j-1)}) \to u_{i(j-1)} \to (\lambda_i) \to x_{i(j-1)}(\mu_i) \to t_{ij}(\lambda_i) \to$ processing a wafer at Step j ($\gamma^1_{ij}) \to$ firing $u_{ij}(\lambda_i)$ again>, it takes $\gamma^1_{ij} + 4\lambda_i + 3\mu_i + \omega_{i(j-1)}$ time units, implying that $\theta_{ij} = \gamma^1_{ij} + 4\lambda_i + 3\mu_i + \omega_{i(j-1)}$, $j \in \mathbb{N}_{n[i]}$. Similarly, $\theta_{i0} = \gamma^1_{i0} + 4\lambda_i + 3\mu_i + \omega_{i(n[i])}$.

If $|IA(PS_{ij})| = 3$, then $IA(PS_{ij}) = \{j, m, j-1\}$, $j \in \mathbb{N}_n[i]$, or $IA(PS_{i0}) = \{0, m, n[i]\}$. Take $IA(PS_{ij}) = \{j, m, j-1\}$ as an example, if $m \in \Lambda_i^R$ and $(j-1) \in \Lambda_i^P$, let $\sigma_1$ denote the time instant when $A_{ij}$ has just been performed, i.e., firing $t_{i(j+1)}$ (or $t_{im}$) ends at $\sigma_i$. In this case, $y_{im}$ is not performed in $A_{im}$, but $R_i$ waits for $\omega_{im}(\geq \gamma^1_{im})$ time units in $p_{im}$ for the completion of a wafer such that it can be unloaded by executing $u_{im}$. Then, $x_{im}$ and $t_{i(m+1)}$ (or $t_{i(j-1)}$) are performed such that $A_{im}$ is completed at time instant $\sigma_2$, and $\sigma_2 - \sigma_1 = 2\lambda_i + \mu_i + \omega_{im}$. By starting from $\sigma_2$, activity sequence ⟨firing $y_{i(j-1)}(\mu_i)$ (since $(j-1) \in \Lambda_i^P) \to$ waiting in $q_{i(j-1)}$ ($\omega_{i(j-1)}) \to \mu_{i(j-1)}(\lambda i) \to x_{i(j-1)}$ $(\mu_i) \to t_{ij}(\lambda_i) \to$ processing a wafer at Step j ($\gamma^1_{ij}) \to u_{ij}(\Delta_i) \to x_{ij}$ $(\mu_i) \to t_{im}(\lambda_i)$⟩ is executed and ends at $\sigma_3$, which completes a wafer processing cycle at $PS_{ij}$. As $\sigma_3 - \sigma_2 = \gamma^1_{ij} + 4\lambda_i + 3\mu_i + \omega_{i(j-1)}$, that results in $\theta_{ij} = \sigma_3 - \sigma_1 = \gamma^1_{ij} + 4\lambda_i + 3\mu_i + \omega_{i(j-1)} + (2\lambda_i + \mu_i + \omega_{im})$.

If $m \in \Lambda_i^P$ and $(j-1) \in \Lambda_i^R$, let $\sigma_1$, $\sigma_2$, and $\sigma_3$ denote the time when execution of $A_{ij}$ (or $t_{i(j+1)}$, or $t_{im}$), $A_{im}$ (or $t_{i(m+1)}$, or $t_{i(j-1)}$), and $t_{im}$ ends, respectively. As $m \in \Lambda_i^P$, $y_{im}$ is performed in $A_{im}$, hence $\sigma_2 - \sigma_1 = 2\lambda_i + 2\mu_i + \omega_{im}$ holds. However, $y_{i(j-1)}$ is not performed in $A_{i(j-1)}$ since $(j-1) \in \Lambda_i^R$, this implies that $\sigma_3 - \sigma_2 = \gamma^1_{ij} + 4\lambda_i + 2\mu_i + \omega_{i(j-1)}$. Thus, $\theta_{ij} = \sigma_3 - \sigma_1 = \gamma^1_{ij} + 4\lambda_i + 2\mu_i + \omega_{i(j-1)} + (2\lambda_i + 2\mu_i + \omega_{im})$.

If $j \in \Lambda_i^R$, $m \in \Lambda_i^R$, and $j-1 \in \Lambda_i^R$, as $y_{im}$ is not performed in $A_{im}$, $\sigma_2 - \sigma_1 = 2\lambda_i + \mu_i + \omega_{im}$ holds. Also, $y_{i(j-1)}$ is not performed in $A_{i(j-1)}$, $\sigma_3 - \sigma_2 = \gamma^1_{ij} + 4\lambda_i + 2\mu_i + \omega_{i(j-1)}$ holds. Hence, $\theta_{ij} = \sigma_3 - \sigma_1 = \gamma^1_{ij} + 4\lambda_i + 2\mu_i + \omega_{i(j-1)} + (2\lambda_i + \mu_i + \omega_{im})$.

It follows from above analysis that, for the wafer processing cycle at $PS_{ij}$, if one basic activity $A_{im}$ is added, $\theta_{ij}$ increases $(2\lambda_i + 2\mu_i + \omega_{im})$ time units. Meanwhile, in $IA(PS_{ij}) \setminus \{j\}$, if the number of indexes that belong to $\Lambda_i^R$ increases by one, $\theta_{ij}$ decreases $\mu_i$ time units. Thus, $\theta_{ij}$ can be calculated for the cases of $|IA(PS_{ij})| = 4, 5, 6, \ldots, n[i]+1$. In this way, $\theta_{ij}$ can be calculated for each Step j in $C_i$. Let $Q(PS_{ij}) = \{IA(PS_{ij}) \setminus \{j\}\} \cap \Lambda_j^R\}$ and $|Q(PS_{ij})|$ be its cardinality. Then, the time taken for processing a wafer at $PS_{ij}$, $j \in \Omega_{n[i]}$ and $i \in \mathbb{N}_K$, is $$\theta_{ij} = \gamma^1_{ij} + 4\lambda_i + 3\mu_i + 2 \times (|IA(PS_{ij})| - 2) \times (\lambda_i + \mu_i) + \sum_{m \in \{IA(PS_{ij}) \setminus \{j\}\}} \omega_{im} - |Q(PS_{ij})| \times \mu_i. \quad (3.2)$$

For the above function (3.2) to hold, one needs to know how to calculate $\alpha^{i(b[i])*}$ and $\alpha_{i0}^*$ when $\gamma^1_{i(b[i])}$ and $\gamma^1_{i0}$ appear. By definition of $\alpha_{i(b[i])}^*$ and $\alpha_{i0}^*$, $\alpha_{i(b[i])}^*$ equals to $\theta_{(i+1)0} - \gamma^1_{(i+1)0}$ and $\alpha_{i0}^*$ equals to $\theta_{(i-1)(b[i-1])} - \gamma^1_{(i-1)(b[i-1])}$. Thus $$\alpha^*_{i(b[i])} = 4\lambda_{i+1} + 3\mu_{i+1} + 2 \times (|IA(PS_{(i+1)0})| - 2) \times (\lambda_{i+1} + \mu_{i+1}) + \sum_{m \in \{IA(PS_{(i+1)0}) \setminus \{0\}\}} \omega_{(i+1)m} - |Q(PS_{(i+1)0})| \times \mu_{i+1}. \quad (3.3)$$

$$\alpha^*_{i0} = 4\lambda_{i-1} + 3\mu_{i-1} + 2 \times (|IA(PS_{(i-1)(b[i-1])})| - 2) \times (\lambda_{i-1} + \mu_{i-1}) + \sum_{m \in \{IA(PS_{(i-1)(b[i-1])}) \setminus \{b[i-1]\}\}} \omega_{(i-1)m} - |Q(PS_{(i-1)(b[i-1])})| \times \mu_{i-1}. \quad (3.4)$$

Let $\phi_3$ and $\phi_3$ be the time instants when firing $t_{i(b[i])}$ and $t_{i0}$ ends, respectively. Then, in a cycle, $u_{i(b[i])}$ and $u_{i0}$ begin to fire at $\phi_4$ and $\phi_4$, respectively. Define $\tau_{i(b[i])}^* = \phi_4 - \phi_3$, $i \in \mathbb{N}_{K-1}$, and $\tau_{i0}^* = \phi_4 - \phi_3$, $i \in \mathbb{N}_K \setminus \{1\}$, as the virtual wafer sojourn time at $PS_{i(b[i])}$ and $PS_{i0}$, respectively. Furthermore, define a function $\gamma^2_{ij}$ as follows.

$$\gamma^2_{ij} = \begin{cases} \tau_{ij}, & \text{if } j \neq b[i], 0 \\ \tau^*_{ij}, & \text{if } j = b[i], 0 \end{cases} \quad (3.5)$$

In practice, after a wafer being processed, it can stay in a PM for some time, or $\gamma^2_{ij} > \gamma^1_{ij}$. This implies that cluster tools can be scheduled, such that $\gamma^2_{ij} \geq \gamma^1_{ij}$. Hence, in (3.2), replace $\gamma^1_{ij}$ by $\gamma^2_{ij}$, this results in $$\pi_{ij} = \gamma^2_{ij} + 4\lambda_i + 3\mu_i + 2 \times (|IA(PS_{ij})| - 2) \times (\lambda_i + \mu_i) + \sum_{m \in \{IA(PS_{ij}) \setminus \{j\}\}} \omega_{im} - |Q(PS_{ij})| \times \mu_i. \quad (3.6)$$

By (3.6), a K-cluster tool can be scheduled such that the time taken for completing a wafer at $PS_{ij}$ is $\pi_{ij}$ with $\gamma^2_{ij} \geq \gamma^1_{ij}$ and $\omega_{ij} \geq 0$, $j \in \Omega_{n[i]}$. To analyze $R_i$'s cycle time in a single-arm tool $C_i$, a definition of basic cycles is required. Basic cycle determination is provided below.

For a single-arm cluster tool, a basic cycle is a robot schedule whose activity indexes are in a decreasing order except those in $\Lambda_i^R$. For instance, $\eta_i = (A_{i0} A_{i4} A_{i2} A_{i1} A_{i3})$ is not a basic cycle, since $1\notin \Lambda_i^R$ and $A_{i1}$ is before $A_{i3}$, i.e., the activity indexes 1 and 3 are not in a decreasing order. By exchanging the position of $A_{i1}$ and $A_{i3}$, a basic cycle $\eta_i=(A_{i0}A_{i4}A_{i2}A_{i3}A_{i1})$ is obtained. $\eta_i=(A_{i0}A_{i1}A_{i2}A_{i5}A_{i3}A_{i4})$ is a basic cycle, since, for it, the robot schedule can be equivalently denoted as $A_{i5}A_{i3}A_{i4}A_{i0}A_{i1}A_{i2}$ that meets the requirement of the definition of a basic cycle. A basic cycle can dominate all other schedules in terms of having shorter cycle time.

In a cycle, let $\psi_{i1}$ be the robot task time without waiting and $\psi_{i2}$ the robot waiting time. For a basic cycle only a backward strategy $\eta_i=(A_{i0}A_{i(n[i])} \ldots A_{i3}A_{i2}A_{i1})$ has no activity index that belongs to $\Lambda_i^R$. For a backward strategy, the following definition can be used $$\psi_i=2(n[i]+1)(\lambda_i+\mu_i)+\Sigma_{j=0}^{n[i]}\omega_{ij}=\psi_{i1}+\psi_{i2} \quad (3.7)$$

where $\psi_{i1}=2(n[i]+1)(\lambda_i+\mu_i)$ is the robot task time without waiting and $\psi_{i2}=\Sigma_{j=0}^{n[i]}\omega_{ij}$ is the robot waiting time in a cycle. For a non-backward basic cycle, as there must exist at least a j such that $j\in\Lambda_i^R$.

The time taken for processing a wafer at $PS_{ij}$, $j\in\Lambda_i^R$ and $i\in\mathbb{N}_K$, is identical to the cycle time of $R_i$, i.e., $\psi_i=\pi_{ij}$. Thus, the robot task time in a cycle can be defined by:

$$\psi_i = \pi_{ij} = \gamma_{ij}^2 + 4\lambda_i + 3\mu_i + 2\times(|IA(PS_{ij})|-2)\times(\lambda_i+\mu_i) + \sum_{m\in\{IA(PS_{ij})\setminus\{j\}\}}\omega_{im} - |Q(PS_{ij})|\times\mu_i, j\in\Lambda_i^R. \quad (3.8)$$

where $\psi_{i1}=4\lambda_i+3\mu_i+2\times(|IA(PS_{ij})|-2)\times(\lambda_i+\mu_i)-|Q(PS_{ij})|\times\mu_i$ is the robot task time without waiting and $\psi_{i2}=\gamma^2_{ij}+\Sigma_{m\in(IA(PS_{ij}))\setminus\{j\}}\omega_{im}$ is the robot waiting time in a cycle. Note that as $j\in\Lambda_i^R$, $\gamma^2_{ij}$ is also a time for robot waiting time.

The manufacturing processes of each step is a serial one. Hence, for an individual tool $C_i$, $i\in\mathbb{N}_K$, in the steady state, the productivity of each step must be identical, and equal to the cycle time of $R_i$, or $$\pi_i=\pi_{i0}=\pi_{i1}=\ldots=\pi_{i(n[i])}=\psi_i. \quad (3.9)$$

It follows from (3.7)-(3.9a) that both $\pi_i$ and $\psi_i$ are functions of $\omega_{ij}$'s, implying that for each individual tool $C_i$, $i\in\mathbb{N}_K$, its schedule is parameterized by $\omega_{ij}$'s. Hence, to schedule a TD single-$\mathbb{N}$ arm K-cluster tool is to determine $\omega_{ij}$'s such that the multiple robots can act in a paced way. To schedule a K cluster tool system that comprises single arm robots, robot waiting times $\omega_{ij}$'s need to be determined/defined such that all the robots function in a paced way.

Following is a description for scheduling the entire cluster tool system 200. In particular the following description is directed to determining a schedule for the entire cluster tool system 200. For $i\in\mathbb{N}_K$ and $j\in\Omega_{n[i]}$, let $\xi_{ij}=\alpha_{ij}+4\lambda_i+3\mu_i+2\times(|IA(PS_{ij})|-2)\times(\lambda_i+\mu_i)+\Sigma_{m\in Q(PS_{ij})}\alpha_{im}-|Q(PS_{ij})|\times\mu_i$ with $\alpha_{i(b[i])}=\alpha_{i0}=0$, $\Pi_i=\max\{\xi_{i0}, \tau_{i1}, \ldots, \xi_{i(n[i])}, \psi_{i1}+(\alpha_{ij}+\Sigma_{m\in Q(PS_{ij})}\alpha_{im})|j\in\Lambda_i^R\}$, and $\Pi=\max\{\Pi_1, \Pi_2, \ldots, \Pi_K\}$. If $C_i$ operates in a backward strategy, there is no $j\in\Lambda_i^R$, hence $\Pi_i=\max\{\xi_{i0}, \xi_{i1}, \ldots, \xi_{i(n[i])}, \psi_{i1}\}$. $\Pi$ must be the LB (lower bound) of cycle time for a TD K-cluster tool. Let $\pi$ denote the cycle time for the whole system, if a cyclic schedule for a K-cluster tool can be determined, such that $\pi=\Pi$, it must be optimal in terms of cycle time.

For the Petri Net model of the buffer module (BM) shown in FIG. 5, it is assumed that, for $C_i$, at marking M, there is a token in $q_{(i+1)0}$ and $t_{i(b[i])}$ is enabled. Then, $t_{i(b[i])}$ begins to fire at time $\phi_5$ such that a token is moved to $p_{i(b[i])}$ ($P_{(i+1)0}$).

This token fires $u_{(i+i)0}$ at time $\phi_6=\phi_5+\lambda_i$. After a cycle, $t_{i(b[i])}$ fires again at time $\phi_7$ and resulting in $\phi_7-\phi_5=\pi_i$. For $C_{i+1}$, after a cycle, $u_{(i+1)0}$ fires again at time $\phi_8$ and hence $\phi_8-\phi_6=\pi_{i+1}$. Note that $u_{(i+i)0}$ can fire only after firing $t_{i(b[i])}$. Thus, $\phi_8\geq\phi_7+\lambda_i$, or $\phi_6+\pi_{i+1}\geq\phi_5+\pi_i+\Delta_i$. As $\phi_6=\phi_5+\lambda_i$, results in $\pi_{i+1}\geq\pi_i$. Similarly, assume that, at marking M, there is a token in $q_{i(b[i])}$ and $t_{(i+1)0}$ is enabled. Thus based on the above description $\pi_{i+1}\leq\pi_i$ holds. Thus, if tool $C_i$, $i\in\mathbb{N}_K$, is scheduled such that its cycle time is $\pi_i$, each individual cluster tool has an identical cycle time which equals to the system cycle time $\pi$. This is defined by expression 4.1 below:

$$\pi_i=\pi, \forall i\in\mathbb{N}_K \quad (4.1)$$

Based on expression 4.1, when the lower bound (LB) of cycle time is reached, hence $$\pi=\pi_i=\Pi, \forall i\in\mathbb{N}_K \quad (4.2)$$

In coordinating the multiple robots, the system can be scheduled such that after $R_i$, $i\in\mathbb{N}_{K-1}$, loads a wafer into $P_{i(b[i])}$ ($P_{(i+1)0}$), $R_{i+1}$ unloads it from $p_{i(b[i])}$ immediately. Then, if the cycle time of each tool is scheduled to be $\Pi$ and meanwhile at any marking M:1) when $R_i$ ($R_{i+1}$) is scheduled to load a token into $p_{i(b[i])}$ ($P_{(i+1)0}$), $t_{i(b[i])}$ ($t_{(i+i)0}$) is enabled; and 2) when $R_i$ ($R_{i+1}$) is scheduled to unload a token from $p_{i(b[i])}$ ($p_{(i+1)0}$), $u_{i(b[i])}$ ($u_{(i+1)0}$) is enabled, an OSLB is obtained and all individual tools can operate in a paced way. To obtain such a schedule, by coordinating $R_i$ and $R_{i+1}$, $i\in\mathbb{N}_{K-1}$, the conditions under which an OSLB exists are presented as follows.

For a TD single-arm K-cluster tool, an OSLB can be obtained, if and only if, for $C_i$ and $C_{i+1}$, $i\in\mathbb{N}_{K-1}$, the following conditions are satisfied by determining $\omega_{ij}$'s and $\omega_{(i+1)l}$'s, $j\in\Omega_{n[i]}$ and $l\in\Omega_{n[i+1]}$.

$$\pi_{ij}=\pi_{(i+1)l}=\Pi, j\in\Omega_{n[i]} \text{ and } l\in\Omega_{n[i+1]}. \quad (4.3)$$

If $b[i]\in\Lambda_i^P$ $$\Pi-\alpha_{(i+1)0}^*\geq\alpha_{i(b[i])}^*. \quad (4.4)$$

If $b[i]\in\Lambda_i^R$ $$\omega_{i(b[i])}\geq\alpha_{i(b[i])}^* \quad (4.5)$$

To obtain a one cycle wafer cyclic schedule with a lower bound OSLB, it follows that from (4.2) that Expression (4.3) must hold. For the BM connecting $C_i$ and $C_{i+1}$, $i\in\mathbb{N}_{K-1}$, it is scheduled such that, after $R_i$, $i\in\mathbb{N}_{K-1}$, loads a wafer into $p_{i(b[i])}$ ($p_{(i+1)0}$), $R_{i+1}$ unloads it from $p_{i(b[i])}$ immediately. Hence, if $b[i]\in\Lambda_i^P$, let $\phi_9$ denote the time instant when firing $t_{i(b[i])}$ ends and firing $u_{(i+1)0}$ starts, $\phi10$ the time when firing $u_{i(b[i])}$ starts, and $\phi_{11}$ the time when firing $t_{i(b[i])}$ ends and firing $u_{(i+1)0}$ starts again. Therefore $\phi_{11}=\phi_9+\Pi$, and $\phi_{11}-\phi_{10}=\Pi-\gamma^2_{i(b[i])}=\pi_{i(b[i])}-\gamma^2_{i(b[i])}=\alpha_{(i+1)0}^*$. Hence, $\phi_{10}-\phi_9=\phi_{10}-(\phi_{11}-\Pi)=-(\phi_{11}-\phi_{10})=\Pi-\alpha_{(i+1)0}^*$.

After firing $t_{i(b[i])}$, let $\phi_{12}$ denote the time instant when firing $t_{(i+1)0}$ ends. This results in $\phi_{12}-\phi_9=\Pi-\gamma^2_{(i+1)0}=\pi_{(i+1)0}-\gamma^2_{(i+1)0}=\alpha_{i(b[i])}$. Expression (4.4) results in $\Pi-\alpha_{(i+1)0}^*\geq\alpha_{i(b[i])}^*$, or $\phi_{10}-\phi_9\geq\phi_{12}-\phi_9$, leading to $\phi_{10}\geq\phi_{12}$. This implies that whenever $u_{i(b[i])}$ and $t_{(i+1)0}$ are scheduled to fire, they are enabled. Hence, the BM does not affect the realization of a cyclic schedule for $C_i$ and $C_{i+1}$. Similarly, if $b[i]\in\Lambda_i^R$, then if (4.5) holds, the BM does not affect the realization of a cyclic schedule for $C_i$ and $C_{i+1}$.

If $b[i]\in\Lambda_i^P$, let $\phi_{13}$ denote the time instant when firing $t_{i(b[i])}$ ends and firing $u_{(i+1)0}$ starts, and $\phi_{14}$ the time instant when firing $u_{i(b[i])}$ starts. Then, from the above analysis, it is true that $\phi_{14}-\phi_{13}=\Pi-\alpha_{(i+1)0}$. After firing $t_{i(b[i])}$, let $\phi_{15}$ denote the time instant when firing $t_{(i+1)0}$ ends. This results in $\phi_{15}-\phi_{13}=\alpha_{i(b[i])}^*$. Assume that (4.4) is not satisfied, or $\phi_{14}-\phi_{13}<\phi_{15}-\phi_{13}$. Then, $\phi_{14}<\phi_{15}$, which implies that when $R_i$ comes to $p_{i(b[i])}$ for unloading a wafer by firing $u_{i(b[i])}$, $u_{i(b[i])}$ is not enabled yet. Hence, $u_{i(b[i])}$ can fire only at time instant $\phi_{15}$ but not $\phi_{14}$, and the time taken for completing a wafer at $PS_{i(b[i])}$ is $\ominus=(\phi_{15}-\phi_{13})+\alpha_{(i+1)0}>(\phi_{14}-\phi_{13})+\alpha_{(i+1)0}^*=\Pi$. This implies that the cycle time is greater than $\Pi$, which shows the necessity of (4.4). Similarly, if $b[i]\in\Lambda_i^R$, can show the necessity of (4.5).

An algorithm or linear program is used to determine the existence of an optimal schedule and if such a schedule exists and the algorithm can be used to determine the schedule. The optimal schedule relates to an optimal one semiconductor product (i.e. wafer) schedule.

Expressions (4.3)-(4.5) are functions of $\omega_{ij}$'s. Hence, for the BM connecting $C_i$ and $C_{i+1}$, $i\in\mathbb{N}_{K-1}$, when $b[i]\in\Lambda_i^P$ (or $\Lambda_i^R$), if Condition (4.4) (or 4.5) is satisfied by properly setting the robot waiting time, $C_i$ and $C_{i+1}$ can operate in a paced way such that an OSLB can be always found. Thus, in scheduling a TD single-arm K-cluster tool, the key is to determine the robot waiting time $a_j$'s such that the multiple robots are well coordinated.

For $j\in(\Lambda_i^R\setminus\{0, b[i]\})$, let $\omega_{ij}^*=\tau_{ij}-\alpha_{ij}$. For $j\in(\Lambda_i^R\cap\{0, b[i]\})$, let $\omega_{ij}^*=\omega_{ij}$. Furthermore, define $S(\omega_{im})=\{j|\omega_{im}$ is an item in $\pi_{ij}\}$, $Z(\pi_{ij})=\{m|\omega_{im}$ is an item in $\pi_{ij}\}$, and a function $\gamma^3_{im}$ as follows.

$$\gamma^3_{im} = \begin{cases} \omega_{im}, & \text{if } m \in \Lambda_i^P \\ \omega_{im}^*, & \text{if } m \in \Lambda_i^R \end{cases} \quad (4.6)$$

Take $\eta_i=(A_{i0}A_{i1}A_{i4}A_{i3}A_{i2})$ as example, according to the above definition, $S(\omega_{i1})=\{0, 2\}$, $Z(\pi_{i0})=\{1, 4\}$ and $Z(\pi_{i2})=\{0, 1\}$. By (4.6), for $m\in\Lambda_i^R$, $\omega_{im}=\alpha_{im}+\gamma^3_{im}$. Then, for each $PS_{ij}$, $\gamma^3_{im}$ is set such that, for each $j\in S(\omega_{im})$, $\gamma^3_{im}+\xi_{ij}+\Sigma_{l\neq m}\gamma^3_{il}\leq\Pi$ with $l\in Z(\pi_{ij})$. Let $\zeta$ denote the remaining time available for assigning. Then, set $\gamma^3_{im}=\Pi-\xi_{ij}-\Sigma_{l\neq m}\gamma^3_{il}$ if $\zeta\geq\Pi-\xi_{ij}-\Sigma_{l\neq m}\gamma^3_{il}$, and otherwise $\gamma^3_{im}=\zeta$. With such a strategy, the waiting time $\gamma^3_{im}$ is set as large as possible.

By Conditions (4.4)-(4.5), for $b[i]\in\Lambda_i^P$, to make Condition (4.4) hold, $\Sigma_{m\in(IA(PS_{i(b[i])})\setminus\{b[i]\})}\omega_{im}$ in $\alpha_{(i+1)0}^*$ and $\Sigma_{m\in(IA(PS_{(i+1)0})\setminus\{0\})}\omega_{(i+1)m}$ in $\alpha_{i(b[i])}^*$ needs to be set, such that they are as small as possible. This implies $\omega_{im}$, $m\notin(IA(PS_{i(b[i])})\setminus\{b[i]\})$, and $\omega_{(i+1)m}$, $m\in(IA(PS_{(i+1)0})\setminus\{0\})$, are set as large as possible. For $b[i]\in\Lambda_i^R$, to make Condition (4.5) hold, $\omega_{i(b[i])}$ needs to be set. The left side of (4.5) is set as large as possible, and at the same time $\Sigma_{m\in(IA(PS_{(i+1)0})\setminus\{0\})}\omega_{(i+1)m}$ in $\alpha_{i(b[i])}^*$ as small as possible. By doing so, in $C_K$, setting $\omega_{Km}$ $m\notin(IA(PS_{KO})\setminus\{0\})$, as large as possible such that $\omega_{Km}$, $m\in(IA(PS_{KO})\setminus\{0\})$, can be as small as possible. Then, for $C_{K-1}$, if $b[K-1]\in\Lambda_{K-1}^P$, then a check is conducted to see if Expression (4.4) holds. If yes, for $C_{K-1}$, first, set $\omega_{(K-1)m}$, $m\notin[(IA(PS_{(K-1)0})\setminus\{0\})\cup(IA(PS_{(K-1)(b[K-1])})\setminus\{b[K-1]\})]$, as large as possible. Then, for $m\in[(IA(PS_{(K-1)(b[K-1])})\setminus\{b[K-1]\})\setminus(IA(PS_{(K-1)0})\setminus\{0\})]$, set $\omega_{(K-1)m}$ as large as possible and meanwhile ensure the satisfaction of Condition (4.4). Then, for $m\in[(IA(PS_{(K-1)(b[K-1])})\setminus\{b[K-1]\})\cap(IA(PS_{(K-1)0})\setminus\{0\})]$, set $\omega_{(K-1)m}$ as large as possible and meanwhile ensure the satisfaction of Condition (4.4). At last, set $\omega_{(K-1)m}$, $m\in[(IA(PS_{(K-1)0})\setminus\{0\})(IA(PS_{(K-1)(b[K-1])})\setminus\{b[K-1]\})]$, as large as possible. In this way, $\omega_{(K-1)m}$, $m\in(IA(PS_{(K-1)0})\setminus\{0\})$, can be as small as possible. However, if Condition (4.4) does not hold, there is no OSLB.

If $b[K-1]\in\Lambda_{K-1}^R$, set $\gamma^3_{i(b[i])}=\alpha_{i(b[i])}^*$ and, for each $j\in S(\omega_{i(b[i])})$, check if $\gamma^3_{i(b[i])}>\text{Min}\{\ominus-\xi_{ij}, \ominus-(\psi_{i1}+\alpha_{ih}+\Sigma_{m\in Q(PS_{ih})}\alpha_{im})|h\in\Lambda_i^R\}$ holds. If yes, there is no OSLB, otherwise, for $m\notin[(IA(PS_{(K-1)0})\setminus\{0\})]$, set $\omega_{(K-1)m}$ as large as possible. In this way, $\omega_{(K-1)m}$, $m\in(IA(PS_{(K-1)0})\setminus\{0\})$, can be as small as possible. Similarly, set the robot waiting time for $C_{K-2}$, $C_{K-3}$, ..., and $C_1$ sequentially. By doing so, the existence of an OSLB can be tested. Let $\Delta_i=\Pi-(4\lambda_r+3\mu_r+2\times(|IA(PS_{i(b[i])})|-2)\times(\lambda_r+\mu_r)-|Q(PS_{i(b[i])})|\times\mu_r)$ and $\nabla_{i+1}=\alpha_{i(b[i])}^*$. Below is an algorithm to determine if an OSLB exists and if so, determine the optimal schedule.

The algorithm 700 and its steps will be described below and with reference to FIG. 7. Below is a description of the steps of the algorithm i.e. method 700 for determining the existence of one wafer cyclic schedule with a lower bound and if so, determining the schedule. The algorithm 700 is configured to determine a robot task time without waiting, and various robot waiting times for different operating conditions. Finally the algorithm determines if an OSLB constant Q is equal to 1 or 0. If Q equals 0 then no OSLB exists and the multi cluster tool system 200 cannot be scheduled in an optimal manner. If Q=1 then an OSLB exists and the multi cluster tool system 200 can be scheduled using the determined robot waiting times. The robot waiting times for each step can be determined and used to control the robot. Details of the algorithm 700 are provided below including sub steps (not illustrated in the figures for clarity).

The method (i.e. algorithm) begins at step 701. Step 701 comprises calculating $\psi_{i1}$, $\xi_{ij}$, $i\in\mathbb{N}_K$ and $j\in\Omega_{n[i]}$, and $\Pi_i=\max\{\xi_{i0}, \xi_{i1}, \ldots, \xi_{i(n[i])}, \psi_{i1}+(\alpha_{ij}+\Sigma_{m\in Q(PS_{ij})}\alpha_{im})|j\in\Lambda_i^R\}$, set $\Pi=\max\{\Pi_1, \Pi_2, \ldots, \Pi_K\}$ and Q=1.

The method progresses to step 702. Step 702 comprises determining $\omega_{Km}$, $m\in\Omega_{n[K]}$, for $R_K$. $\omega_{Km}$ is determined using the following sub steps:

702a. i=K and initialize $\gamma^3_{im}=0$, $m\in\Omega_{n[i]}$;

702b. For (m=0; m≤n[i]; m++), while $m\notin(IA(PS_{i0})\setminus\{0\})$, modify $\gamma^3_{im}=\text{Min}\{\Pi-\xi_{ij}-\Sigma_{l\neq m}\gamma_{il}^3, \Pi-(\psi_{i1}+\alpha_{ih}+\Sigma_{n\in Q(PS_{ih})}\alpha_{in})-\Sigma_{q=0}^{n[i]}\gamma_{iq}^3\}$ with $j\in S(\omega_{im})$, $l\in Z(\pi_{ij})$, and $h\in\Lambda_i^R$;

702c. For (m=0; m≤n[i]; m++), while $m\in(IA(PS_{i0})\setminus\{0\})$, modify $\gamma^3_{im}$ as Step b;

702d. For $m\in\Omega_{n[i]}$, if $m\in\Lambda_i^R$, $\omega_{im}=\gamma^3_{im}+\alpha_{im}$, otherwise, $\omega_{im}=\gamma^3_{im}$;

702e. i→i-1;

702f. In $C_i$, if $b[i]\in\Lambda_i^P$, go to Step 703, or otherwise Step 704.

Step 703 comprises determining $\omega_{im}$, $i\in\mathbb{N}_{K-1}$, $m\in\Omega_{n[i]}$, for $R_i$ if $b[i]\in\Lambda_i^P$. $\omega_{im}$, $i\in\mathbb{N}_{K-1}$, $m\in\Omega_{n[i]}$, for $R_i$ if $b[i]\in\Lambda_i^P$ can be determined by the following sub steps:

703a. Initialize $\gamma^3_{im}=0$, $m\in\Omega_{n[i]}$;

703b. If $\Delta_i<\nabla_{i+1}$, Q=0, and go to Step 5, otherwise, for (m=0; m≤n[i]; m++), while $m\notin[(IA(PS_{i0})\setminus\{0\})\cup(IA(PS_{i(b[i])})\setminus\{b[i]\})]$, modify $\gamma^3_{im}$ as sub step 702b;

703c. For (m=0; m≤n[i]; m++), while $m\in[(IA(PS_{i(b[i])})\setminus\{b[i]\})\setminus(IA(PS_{i0})\setminus\{0\})]$, modify $\gamma^3_{im}=\text{Min}\{\Pi-\xi_{ij}-\Sigma_{l\neq m}\gamma_{il}^3, \Pi-(\psi_{i1}+\alpha_{ih}+\Sigma_{n\in Q(PS_{ih})}\alpha_{in})-\Sigma_{q=0}^{n[i]}\gamma_{iq}^3, \Delta_i-\nabla_{i+1}-\Sigma_{p\in(IA(PS_{i(b[i])})\setminus\{b[i],m\})}\gamma_{ip}^3\}$, $j\in S(\omega_{im})$, $l\in Z(\pi_{ij})$, and $h\in\Lambda_i^R$;

703d. For (m=0; m≤n[i]; m++), while $m\in[(IA(PS_{i(b[i])})\setminus\{b[i]\})\cup(IA(PS_{i0})\setminus\{0\})]$, modify $\gamma^3_{im}$ as Step 703c;

703e. For (m=0; m≤n[i]; m++), while $m\in[(IA(PS_{i0})\setminus\{0\})(IA(PS_{i(b[i])})\setminus\{b[i]\})]$, modify $\gamma^3_{im}$ as Step 702b;

703f. For $m\in\Omega_{n[i]}$, if $m\in\Lambda_i^R$, $\omega_{im}=\gamma^3_{im}+\alpha_{im}$, otherwise $\omega_{im}=\gamma^3_{im}$;

703g. i→i-1;

703h. In $C_i$, if $b[i] \in \Lambda_i^P$, back to Step 700, otherwise proceed to Step 704.

Step 704 comprises determining $\omega_{im}$, $i \in \mathbb{N}_{K-1}$, $m \in \Omega_{n[i]}$, for $R_i$ if $b[i] \in \Lambda_i^R$. $\omega_{im} \in \mathbb{N}_{K-1} m \in \Omega_{n[i]}$, for $R_i$ if $b[i] \in \Lambda_i^R$ is determined using the following sub steps.

704a. Initialize $\gamma^3_{im} = 0$, $m \in \Omega_{n[i]}$;

704b. Modify $\gamma^3_{i(b[i])} = \alpha_{i(b[i])}^*$, if $\gamma^3_{i(b[i])} > \text{Min}\{\Pi - \xi_{ij}, \Pi - (\psi_{i1} + \alpha_{ih} + \Sigma_{m \in Q(PS_{ih})} \alpha_{im})\}$ with $j \in S(\omega_{i(b[i])})$ and $h \in \Lambda_i^R$, $Q=0$ and go to step 705, otherwise proceed to sub step 704c;

704c. For (m=0; m≤n[i]; m++), while $m \in [IA(PS_{i0}) \setminus \{0\}]$, modify $\gamma^3_{im}$ (including $\gamma^3_{i(b[i])}$ if $b[i] \notin [IA(PS_{i0}) \setminus \{0\}]$) as per sub step 702b;

704d. For (m=0; m≤n[i]; m++), while $m \in [IA(PS_{i0}) \setminus \{0\}]$, modify $\gamma^3_{im}$ (including $\gamma^3_{i(b[i])}$ if $b[i] \in [IA(PS_{i0}) \setminus \{0\}]$) as per sub step 702b;

704e. For $m \in \Omega_{n[i]}$, if $m \in \Lambda_i^R$, $\omega_{im} = \gamma^3_{im} + \alpha_{im}$, otherwise, $\omega_{im} = \gamma^3_{im}$;

704f. i→i→1;

704g. In $C_i$, if $b[i] \in \Lambda_i^P$, back to step 703, otherwise go to step 704.

At step 705 the algorithm 700 returns a Q value and ends.

It should be understood that the specific sub steps of each main step in the algorithm 700 can be suitably modified depending on the mathematical model applied to the system 200. The sub steps are defined based on the Petri Net models of FIGS. 4 and 5. Step 704 is only exited if the condition in sub step 704b is met.

In Step 702 of algorithm 700 comprises the step of initializing $\gamma^3_{im} = 0$, $m \in \Omega_{n[i]}$. Then, in 702b, for $m \notin (IA(PS_{i0}) \setminus \{0\})$, set $\gamma^3_{im}$ as large as possible. As $\Pi - \xi_{ij} - \Sigma_{l \neq m} \gamma_{il}^3 \geq 0$ and $\Pi - (\psi_{i1} + \alpha_{ih} + \Sigma_{n \in Q(PS_{ih})} \alpha_{in}) - \Sigma_{q=0}^{n[i]} \gamma_{iq}^3 \geq 0$, $\gamma^3_{im}$ is nonnegative. Let $\gamma^3_{iq}$ denote the last one to be set, it must have $\gamma^3_{iq} = \Pi - (\psi_{i1} + \alpha_{ih} + \Sigma_{n \in Q(PS_{ih})} \alpha_{in}) - \Sigma_{m \in \{\Omega_{\eta[i]} \setminus \{q\}\}} \gamma_{im}^3$, such that $\Sigma_{m=0}^{n[i]} \omega_{im} = \Pi - \psi_{i1}$, where $\omega_{im} = \gamma^3_{im} + \alpha_{im}$ if $m \in \Lambda_i^R$, and $\omega_{im} = \gamma^3_{im}$ if $m \in \Lambda_i^P$. In this way, the cycle time of $C_i$ is defined to be equal to Π as required and the robot waiting time set in step 702 is nonnegative. Similarly, the robot waiting time set in steps 703 and 704 are nonnegative and since $\Sigma_{m=0}^{n[i]} \omega_{im} = \Pi - \psi_{i1}$, where $\omega_{im} = \gamma^3_{im} + \alpha_{im}$ if $m \in \Lambda_i^R$, and $\gamma^3_{im} = im$ if $m \in \Lambda_i^P$.

Based on algorithm 700 (or linear program) if Q=0 is returned, there is no OSLB i.e. there is no one wafer cyclic schedule and no optimal schedule can be obtained. If Q is returned as 0 an alarm may be raised and displayed via the user interface 260.

If Q=1, an OSLB is obtained by setting the robots' waiting time. To check if such a schedule exists, based on algorithm 700, the robot waiting times are set from the tail to the head tool one by one. In the worst case, this needs to be done for every cluster tool once and meanwhile check if Condition (4.4) or (4.5), from above, is satisfied for each buffer module (BM). Let $H = \text{Max}(n[i]+1)$, $i \in \mathbb{N}_K$. For each Step $j$ in $C_i$, set $\gamma^3_{im} = 0$, $m \in \Omega_{n[i]}$. Then, calculate the value of $\gamma^3_{im}$, $m \in \Omega_{n[i]}$, one by one. At last, for $m \in \Lambda_i^R$, set $\omega_{im} = \gamma^3_{im} + \alpha_{im}$, otherwise $\omega_{im} = \gamma^3_{im}$. Thus, there are at most 2H+1 operations in setting the robot waiting time in $C_i$, $i \in c$ $\mathbb{N}_K$. Also, there are K-1 BMs for checking Condition (4.4) or (4.5). Hence, totally, there are at most (2H+1)×K+K-1=2(H+1)×K-1 operations. In practice, H and K are bounded to known constants. Thus, the computational complexity of Algorithm 700 is also bounded by a constant.

Figure 8:
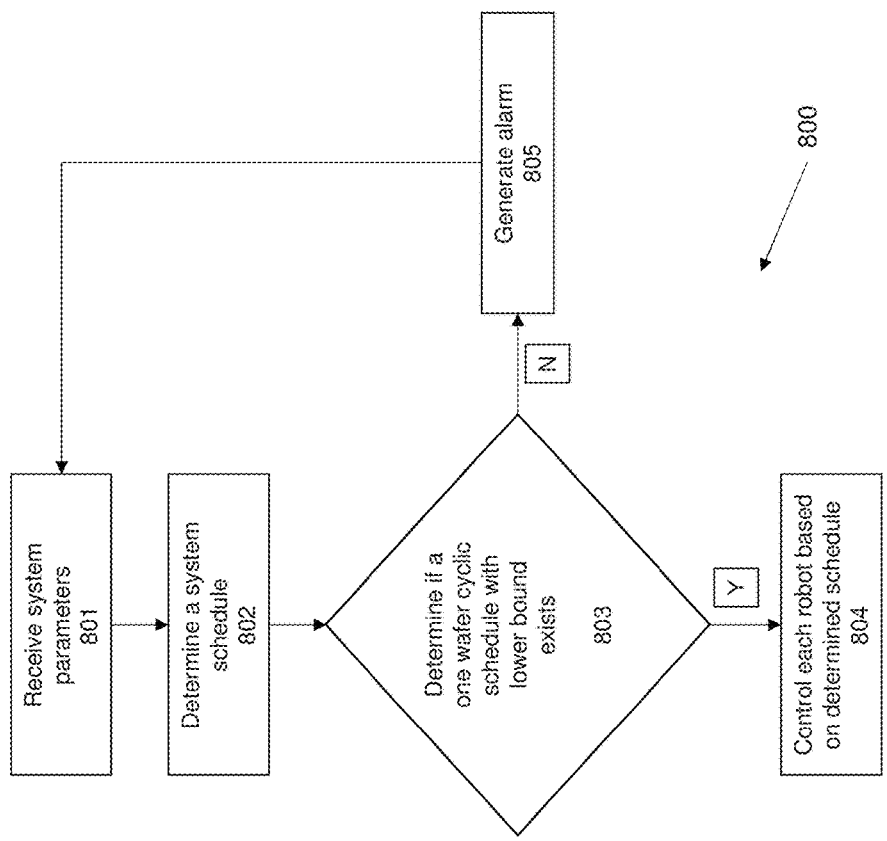
FIG. 8 shows an embodiment for controlling a multi cluster tool system.

FIG. 8 illustrates a method 800 for controlling a multi cluster tool system, such as system 200. The method 800 of controlling a multi cluster tool system comprises a plurality of steps that are executed by the controller 300. The method comprises receiving a plurality of system parameters from a user interface 260 at step 801. The parameters correspond to one or more processing steps in a system cycle and the parameters are time values. A system cycle is a cycle or plurality of steps for processing a semiconductor product.

At step 802 the method determines a system schedule for the multi cluster tool system 200.

The schedule comprises control information and in particular the schedule comprises robot waiting times. The determined schedule is an optimal schedule and is determined assuming the system cycle is an OSLB i.e. a one wafer cyclic schedule with a lower bound.

At step 803 the method comprises checking if an OSLB exists i.e. if an optimal schedule exists. The method utilizes algorithm 700 including all the sub steps to determine the schedule and if an optimal schedule exists. If an optimal schedule exists the method proceeds to step 804 that comprises controlling each robot based on a determined robot waiting time for that particular robot. Alternatively if no optimal schedule exists the method returns to step 801 and generates an alarm at step 805. The alarm is outputted via the user interface 260.

The methods 800 and 700 are executed by the processor 302 of the controller. The methods may be programmed and stored within the memory unit as computer executable instructions.

FIG. 9 shows a further embodiment of a method 900 of controlling a multi cluster tool system. The method 900 is used to control the operation of the multi cluster tool system 200 based on a determined schedule. The determined schedule sets at least the robot waiting times. The method further uses other system parameters and predetermined system parameters to control the operation of each robot 231-235. The robots are operated in a paced manner such that all the robots are coordinated. The method 900 is advantageous because it reduces the robot waiting times and ensures that all robots act in a coordinated manner to reduce any collisions, accidents, lag times and idle time a robot is not performing a task. The scheduling of robots 231-235 and control of the robots 231-235 based on the determined schedule further provides an optimal system cycle for processing wafers with the system 200.

The system cycle i.e. process a wafer undergoes as part of processing in the multi cluster tool system 200 is optimized. This is advantageous because the determined schedule and method of control can maximize the number of wafers being produced while maintaining the quality of wafers being produced.

Referring to FIG. 9, the method begins at step 901. Step 901 comprises receiving a plurality of system parameters from a user interface 260. The system parameters are time values associated with steps or transitions in the system cycle.

The method transitions to step 902. At step 902 comprises determining a fundamental period FP for each cluster tool within the multi cluster tool system. The fundamental period can be determined using the mathematical definitions and expressions explained earlier. At step 903 a bottleneck cluster tool is determined. A bottleneck cluster tool is the cluster tool that has the longest fundamental period and it is assumed that the tool is transport bound.

At step 904 the method comprises determining a processing cycle time for at least the bottleneck tool. The processing cycle time can be determined based on a known polynomial algorithm. Step 904 may also comprise determining a processing cycle time for each cluster tool in the multi cluster tool system 200. The processing cycle time is the time taken for a wafer to complete one wafer cycle in a single cluster tool.

The method proceeds to step 905. At step 905 the fundamental period of the other cluster tools is compared with the processing cycle time of the bottleneck cluster tool. The processing cycle time for a cluster tool is the longest natural workload for a processing step associated with a cluster tool.

Step 906 comprises determining a scheduling strategy for multi cluster tool system 200. The scheduling strategy is determined based on if the fundamental period of the other cluster tools is greater or less than the predetermined processing cycle time. The particular type of scheduling strategy is determined based on a relationship of the fundamental periods of the other cluster tools and the processing cycle time of bottleneck cluster tool. If the fundamental periods of all other cluster tools are less than the processing cycle time, then a backward strategy can be applied to all the cluster tools in the multi cluster tool system without deteriorating the performance. If the fundamental period of at least one cluster tool is greater than the processing cycle time, then a backward strategy is applied to all the cluster tools except the bottleneck tool.

At step 907 the method determines a natural workload for each processing step of each processing cycle associated for at least the bottleneck cluster tool. The natural workload may also be determined for the other cluster tools in the system. Step 908 comprises determining a system cycle time. The system cycle time is determined by comparing the processing cycle times of all cluster tools within the multi cluster tool system 200. The system cycle time is equal to or relates to the longest processing cycle. The system cycle time is the time taken for a wafer to complete a cycle in the multi cluster tool system 200.

Step 909 comprises the step of checking if a one wafer cyclic schedule with a lower bound (OSLB) exists (i.e. if an optimal cyclic schedule exists). This step is conducted prior to the step of controlling the robots. The method proceeds to step 910 if a one wafer optimal schedule with a lower bound exists. Step 910 comprises determining a schedule using the algorithm 700. The algorithm 700 can be used to determine if an optimal schedule exists. The schedule provides at least robot waiting times. At step 911 the controller controls the operation of each robot in the multi cluster tool system 200 based on the robot waiting times. If an OSLB does not exist the method returns back to step 901.

The method 900 as described, in particular determining the schedule, is determined based on a mathematical model of the multi cluster tool system. The mathematical model is a Petri net model described earlier in FIGS. 4 and 5. The method 900 is advantageous because it determines an optimal schedule that defines a robot waiting time. The robot waiting times that are determined as part of the method result in an optimal operation or functioning of the multi cluster tool system.

Below are two illustrative examples of the method of controlling a multi cluster tool system in operation. The examples show an illustrative implementation of the method of controlling a multi cluster tool system.

Example 1

A 2-cluster tool with activity time as follows: for $C_1$, $\alpha_{10}=0$ (the loadlocks), $\alpha_{11}=45$, $\alpha_{12}=0$ (the BM), $\alpha_{13}=5$, $\alpha_{14}=5$, $\lambda_1=5$, and $\mu_1=6$; for $C_2$, $\alpha_{20}=0$, $\alpha_{21}=50$, $\alpha_{22}=80$, $\alpha_{23}=69$, $\alpha_{24}=77$, $\lambda_2=3$, and $\mu_2=4$.

First calculate the FP of $C_1$ and $C_2$, resulting in $FP_1=110$ and $FP_2=104$. As $C_1$ is the bottleneck tool and it is TB, an optimal strategy $\eta_1=(A_{10}A_{13}A_{14}A_{11}A_{12})$ is found to obtain an $O^2CS$ with cycle time $\Pi_1=103$ for $C_1$. Since $FP_2>\Pi_1$ and $C_2$ is PB. Thus, a backward strategy $\eta_2=(A_{20}A_{24}A_{23}A_{22}A_{21})$ is applied to $C_2$ and the LB of the system is $\Pi=\Pi_2=104$.

By applying $\eta_1$ to $C_1$, there is defined $\xi_{10}=\alpha_{10}+\alpha_{14}+6\lambda_1+4\mu_1=59$, $\xi_{11}=\alpha_{11}+\alpha_{12}+6\lambda_1+4\mu_1=99$, $\xi_{12}=\alpha_{12}+\alpha_{14}+10\lambda_1+8\mu_1=103$, $\xi_{13}=\alpha_{13}+\alpha_{14}+\alpha_{12}+8\lambda_1+5\mu_1=80$, $\xi_{14}=\alpha_{14}+\alpha_{14}+10\lambda_1+8\mu_1=\psi_{11}+\alpha_{1j}+\Sigma_{m\in Q(PS_{1j})}\alpha_{1m}=\Pi_1=103$. With $\eta_2$ for $C_2$, the natural workload can be defined as $\xi_{20}=24$, $\xi_{21}=74$, $\xi_{22}=104$, $\xi_{23}=93$, $\xi_{24}=101$, $\psi_{21}+\alpha_{2j}+\Sigma_{m\in Q(PS_{2j})}\alpha_{2m}=\psi_{21}=70$, and $\Pi_2=104$. Thus, set $\pi_1=\pi_2=\Pi=\max\{\Pi_1, \Pi_2\}=104s$.

By Algorithm 700, for $C_2$, initialize $\gamma^3_{2m}=0$, $m\in\Omega_{n[2]}$. Then, modify $\gamma^3_{20}=\text{Min}\{\Pi-\xi_{2j}-\Sigma_{l=0}\gamma^3_{21}, \Pi-(\psi_{21}+\alpha_{2h}+\Sigma_{m\in Q(PS_{2h})}\alpha_{2m})-\Sigma_{q=0}^{n[2]}\gamma_{2q}^3\}$ with $j\in S(\omega_{20})$, $l\in Z(\pi_{2j})$, and $h\in\Lambda_2^R$, to obtain $\omega_{20}=\gamma^3_{20}=\text{Min}\{104-74, 104-70\}=30$; similarly, modify $\gamma^3_{21}$ and $\gamma^3_{22}$ to obtain $\omega_{21}=\gamma^3_{21}=\text{Min}\{104-104, 104-70-30\}=0$, $\omega_{22}=\gamma^3_{22}=\text{Min}\{104-93, 104-70-30\}=4$, $\omega_{23}=\omega_{24}=0$. For $C_1$, $b[1]=2\in\Lambda_1^R$. Based on step 704 in Algorithm 700, $\gamma^3_{i(b[i])}=\gamma^3_{12}=\alpha_{1(b[1])}=4\lambda_2+3\mu_2+\omega_{24}=24$. Since $\gamma^3_{12}>\text{Min}\{104-\xi_{11}, 104-\xi_{13}, 104-\xi_{14}, \Pi-(\psi_{11}+\alpha_{12}+\Sigma_{m\in Q(PS_{1j})}\alpha_{1m})\}=\text{Min}\{104-99, 104-80, 104-103, 104-103\}=1$, $Q=0$ is returned, an OSLB cannot be found.

Example 2

It is a 3-cluster tool with activity time as follows: for $C_1$, $\alpha_{11}=5$, $\alpha_{12}=0$ (the BM), $\alpha_{13}=35$, $\lambda_1=5$, and $\mu_1=10$; for $C_2$, $\alpha_{21}=41$, $\alpha_{22}=0$ (the BM), $\alpha_{23}=60$, $\lambda_2=1$, and $\mu_2=1$; for $C_3$, $\alpha_{31}=100$, $\alpha_{32}=60$, $\alpha_{33}=50$, $\lambda_3=3$, and $\mu_3=2$.

For this example, $FP_1=120$, $FP_2=67$, $FP_3=118$. As $C_1$ is the bottleneck tool and it is TB, an optimal strategy $\eta_1=(A_{10}A_{13}A_{11}A_{12})$ is found to obtain an $O^2CS$ with cycle time $\Pi_1=110$ for $C_1$. Since $FP_3>\Pi_1$ and $C_3$ is PB, a backward strategy is applied to both $C_2$ and $C_3$, or $\eta_2=(A_{20}A_{23}A_{22}A_{21})$ and $\eta_3=(A_{30}A_{33}A_{32}A_{31})$.

For $C_1$, $\xi_{10}=4\lambda_1+3\mu 1=50$, $\xi_{11}=\alpha_{11}+\alpha_{12}+6\lambda_1+4\mu_1=70$, $\xi_{12}=\alpha_{12}+8\lambda_1+7\mu_1=110$, $\xi_{13}=\alpha_{13}+\alpha_{12}+6\lambda_1+4\mu_1=105$, $\{\psi_{11}+(\alpha_{1j}+\Sigma_{m\in Q(PS_{1j})}=1m)|j\in\Lambda_l^R\}=\xi_{12}=110$, thus, $\Pi_1=\xi_{12}=110$. Similarly, for $C_2$, $\xi_{20}=7$, $\xi_{21}=48$, $\xi_{22}=7$, $\xi_{23}=67$, $\{\psi_{21}+(\alpha_{2j}+\Sigma_{m\in Q(PS_{2j})}\alpha_{2m})|\in\Lambda_2^R\}=\psi_{21}=8\times(\lambda_2+\mu_2)=8\times 2=16$, and $\Pi_2=\xi_{23}=67$. For $C_3$, have $\xi_{30}=18$, $\xi_{31}=118$, $\xi_{32}=78$, $\xi_{33}=68$, $\{\psi_{31}+(\alpha_{3j}+\Sigma_{m\in Q(PS_{3j})}\alpha_{3m}|j\in\Lambda_3^R\}=\psi_{31}=8\times(\lambda_3+\mu_3)=8335=40$, and $\Pi_3=118$. As $\Pi_3=118>\Pi_1>\Pi_2$, thus $\Pi=118$ s.

By algorithm 700, for $C_3$, first initialize $\gamma^3_{3m}=0$, $m\gamma\Omega_{n[3]}$. Then, modify $\gamma^3_{30}$ to obtain $\omega_{30}=\gamma^3_{30}=\text{Min}\{\Pi-\xi_{31}, \Pi-\psi_{31}\}=\text{Min}\{118-118, 118-40\}=0$. Similarly, it can be obtained that $\omega_{31}=\gamma^3_{31}=40$, $\omega_{32}=\gamma^3_{32}=38$, $\omega_{33}=\gamma^3_{33}=0$. For $C_2$, $b[2]=2\ominus\Lambda_2^P$, results in $\Delta_2=\Pi-4\lambda_2-3\mu_2=118-7=111>\alpha_{2(b[2])}^*=4\lambda_3+3\mu_3+\omega_{33}=18$. Then, for $m\notin[(IA(PS_{20})\backslash\{0\})\cup(IA(PS_{2(b[2])})\backslash\{b[2]\})]$, or $m\in\{1, 3\}$, or $m=0, 2$, resulting in $\omega_{20}=\gamma^3_{20}=70$, and $\omega_{22}=\gamma^3_{22}=32$. At last, for $m=1, 3$, hence $\omega_{21}=\gamma^3_{21}=\omega_{23}=\gamma^3_{23}=0$. For $C_1$, $b[1]=2\in\Lambda_l^R$, by Step 704 of Algorithm 700, first initialize $\gamma^3_{1m}=0$, $m\in\Omega_{n[1]}$. Hence, $\gamma^3_{12}=\alpha_{12}*=4\lambda_2+3\mu_2+\omega_{23}=7$. Since $\gamma^3_{12}=7<\text{Min}\{\Pi-\xi_{11}, \Pi-\xi_{13}, \Pi-\{\psi_{11}+(\alpha_{1j}+\Sigma_{m\in Q(PS_{1j})}\alpha_{1m})|j\in\Lambda_l^R\}\}=\text{Min}\{118-75, 118-105, 118-110\}=8$, $Q=1$ is returned, or an OSLB exists. Then, for $m\notin[IA(PS_{j0})\backslash\{0\}]$, or $m=0, 1, 2$, modify $\gamma^3_{10}$ and $\gamma^3_{10}=\text{Min}\{\Pi-\xi_{11}-\gamma^3_{12}, \Pi-\xi_{12}, \Pi-\{\psi_{11}+(\alpha_{1j}+\Sigma_{m\in Q(PS_{1j})}|j\in\Lambda_l^R\}-\gamma^3_{12}\}=\text{Min}\{118-70-7, 118-110, 118-110-7\}=1$. It can be easily got that the robot waiting time has been all allocated. Thus, $\gamma^3_{11}=0$, $\gamma^3_{12}=7$, and $\gamma^3_{13}=0$. At last, the $\omega_{10}=\gamma^3_{10}=1$, $\omega_{11}=\gamma^3_{11}=0$, $\omega_{12}=\gamma^3_{12}=7$, and $\omega_{13}=\gamma^3_{13}=0$.

It should be noted that in this disclosure the cluster tool may be referred to as a cluster tool apparatus or cluster tool system. The term apparatus and system are used interchangeably when describing the cluster tool and its operations.

It will be appreciated by persons skilled in the art that numerous variations and/or modifications may be made to the described cluster tool apparatus and method of controlling the cluster tool apparatus as shown in the specific embodiments without departing from the spirit or scope of the present disclosure. The present embodiments are, therefore, to be considered in all respects as illustrative and not restrictive.

The term "comprising" (and its grammatical variations) as used herein are used in the inclusive sense of "having" or "including" and not in the sense of "consisting only of"

It is to be understood that, if any prior art information is referred to herein, such reference does not constitute an admission that the information forms a part of the common general knowledge in the art, in Australia or any other country.

Although not required, the embodiments described with reference to the figures may be implemented as an Application Programming Interface (API) or as a series of libraries for use by a developer or can be included within another software application, such as a terminal or personal computer operating system or a portable computing device operating system.

Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present disclosure are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

The invention claimed is:

1. A method of controlling a transport-bound multi cluster tool system, the transport-bound multi cluster tool system being configured to process a semiconductor product, the transport-bound multi cluster tool system including a plurality of cluster tools arranged adjacent each other in a linear topology and with a buffer module positioned between one or more respective pair of the cluster tools, each of the cluster tools including a plurality of processing modules and a single-arm robot with a single robotic arm for moving a semiconductor product between the respective buffer module and the respective processing modules of the corresponding cluster tool, the method comprising:

receiving a plurality of system parameters from a user interface, the system parameters corresponding to one or more processing steps in a system cycle, wherein the system cycle is a one semiconductor product cycle that defines a plurality of processing cycles each of which is associated with a respective cluster tool and is to be executed only once, determining, based on the received system parameters, a processing cycle for each of the cluster tools, the processing cycle for each of the cluster tools comprises processing steps for the respective cluster tool, and each of the processing steps corresponds to processing at a processing module of the respective cluster tool, wherein the system cycle comprises a plurality of the determined processing cycles of the cluster tools, determining, based on the determined processing cycles, a system schedule for defining the system cycle for processing the semiconductor product with minimum processing time from start to finish through the cluster tools, the system schedule providing single-arm robot waiting times for each single-arm robot of each of the cluster tools and defining the order of processing cycles to be performed, and controlling, via a controller, the operation of each single-arm robot of each of the cluster tools based on the determined system schedule; wherein determining the system schedule includes:

determining a fundamental period for each of the cluster tools within the transport-bound multi cluster tool system, the fundamental period being transport-bound;

determining from each of the cluster tools a bottleneck cluster tool that operates in a transport bound region, wherein the bottleneck cluster tool is the cluster tool with the longest fundamental period;

determining a processing cycle time for at least the bottleneck cluster tool based on a polynomial algorithm;

comparing the fundamental period of the other cluster tools with the processing cycle time of the bottleneck cluster tool, wherein the processing cycle time relates to time taken to complete processing in the bottleneck cluster tool; and determining a scheduling strategy for the system schedule based on the comparison.

2. The method of controlling a multi cluster tool system in accordance with claim 1, wherein the method further comprises the additional steps of determining a natural workload for each processing step of each processing cycle, determining a processing cycle time for each of the cluster tools, wherein the processing cycle time equals the longest natural workload for a processing step associated with a cluster tool, comparing the processing cycle times of each of the cluster tools within the transport-bound multi cluster tool system, determining a system cycle time, wherein the system cycle time is equal to or relates to the longest processing cycle.

3. The method of claim 1, wherein the system schedule is determined based on a mathematical model of the transport-bound multi cluster tool system, the mathematical model of the transport-bound multi cluster tool system being a Petri net model, wherein the mathematical model of the transport-bound multi cluster tool system modelling each processing step within the system cycle, each processing step being modelled to include a plurality of transitions, and;

wherein the system parameters are a time duration associated with each transition and place of the processing step.

4. The method of claim 3, wherein the system parameters comprise one or more of:

a time value for processing a semiconductor product at each processing module in each of the cluster tools, an unloading time value for the single-arm robot to unload a semiconductor product from a processing module in each of the cluster tools, a loading time value for the single-arm robot to load a semiconductor product into a processing module in each of the cluster tools, a semiconductor product residence time in a processing module of each of the cluster tools, a single-arm robot moving time, the single-arm robot moving time being related to the time for the single-arm robot moving from one processing module to an another processing module.

5. A transport-bound multi cluster tool system comprising:

a plurality of cluster tools positioned adjacent each other in a linear topology and a buffer module located between one or more respective pair of cluster tools; wherein each of the cluster tools include a plurality of processing modules and a single-arm robot with a single robotic arm for moving a semiconductor product between the respective buffer module and respective processing modules of the corresponding cluster tool, a user interface in electronic communication with a controller, the user interface configured to allow a user to communicate with the transport-bound multi cluster tool system, the controller being in electronic communication with each single-arm robot within the transport-bound multi cluster tool system, the controller being configured to execute a method of controlling the transport-bound multi cluster tool system, wherein the method comprises the steps of:

receiving a plurality of system parameters from the user interface, the system parameters corresponding to one or more processing steps in a system cycle, wherein the system cycle is a one semiconductor product cycle that defines a plurality of processing cycles each of which is associated with a respective cluster tool and is to be executed only once, determining, based on the received system parameters, a processing cycle for each of the cluster tools, the processing cycle for each of the cluster tools comprises processing steps for the respective cluster tool, and each of the processing steps corresponds to processing at a processing module of the respective cluster tool, wherein the system cycle comprises a plurality of the determined processing cycles of the cluster tools, determining, based on the received processing cycles, a system schedule for defining the system cycle for processing the semiconductor product with minimum processing time from start to finish through the cluster tools, the system schedule providing single-arm robot waiting times for each single-arm robot of each of the cluster tools and defining the order of processing cycles to be performed, and controlling the operation of each single-arm robot of each of the cluster tools based on the determined schedule; wherein determining the system schedule includes:

determining a fundamental period for each of the cluster tools within the transport-bound multi cluster tool system, the fundamental period being transport-bound;

determining, from each of the cluster tools, a bottleneck cluster tool that operates in a transport bound region, wherein the bottleneck cluster tool is the cluster tool with the longest fundamental period;

determining a processing cycle time for at least the bottleneck cluster tool based a polynomial algorithm;

comparing the fundamental period of the other cluster tools with the processing cycle time of the bottleneck cluster tool, wherein the processing cycle time relates to time taken to complete processing in the bottleneck cluster tool; and determining a scheduling strategy based on the comparison.

6. The transport-bound multi cluster tool system in accordance with claim 5, wherein the controller is further configured to:

determine a natural for each processing step of each processing cycle, determine a processing cycle time for each of the cluster tools, wherein the processing cycle time equals the longest natural workload for a processing step associated with a cluster tool, compare the processing cycle times of each of the cluster tools within the transport-bound multi cluster tool system, and determine a system cycle time, wherein the system cycle time is equal to or relates to the longest processing cycle.

7. The transport-bound multi cluster tool system in accordance with claim 5, wherein the system schedule is determined based on a mathematical model of the transport-bound multi cluster tool system, the mathematical model of the transport-bound multi cluster tool system being a Petri net model, wherein the mathematical model of the transport-bound multi cluster tool system comprises a model of each processing step within the system cycle, each processing step being modelled to include a plurality of transitions and places, and;

wherein the system parameters are a time duration associated with each transition and place of the processing step; and wherein the mathematical model being a predetermined mathematical model that is stored in the controller.

8. The transport-bound multi cluster tool system in accordance with claim 5, wherein the system parameters comprise one or more of:

a time value for processing a semiconductor product at each processing module in each cluster tool, an unloading time value for the single-arm robot to unload a semiconductor product from a processing module in each of the cluster tools, a loading time value for the single-arm robot to load a semiconductor product into a processing module in each of the cluster tools, a semiconductor product residence time in a processing module of each of the cluster tools, a single-arm robot moving time, the single-arm robot moving time being related to the time for the single-arm robot moving from one processing module to another processing module.

9. The transport-bound multi cluster tool system in accordance with claim 5, wherein the controller comprises:

a processor, a memory unit and a single-arm robot interface, the single-arm robot interface configured to communicate with each single-arm robot in the transport-bound multi cluster tool system, the processor in electronic communication with the memory unit and the single-arm robot interface, the memory unit being a non-transitory computer readable medium, the memory unit storing the method of controlling the transport-bound multi cluster tool system as a set of computer executable instructions, the memory unit further storing the mathematical model of the transport-bound multi cluster tool system, the processor being configured to execute the stored instructions and perform the method of controlling the transport-bound multi cluster tool system and wherein the processor configured to control each single-arm robot of the transport-bound multi cluster tool system based on the method of controlling the transport-bound multi cluster tool system.

10. The transport-bound multi cluster tool system in accordance with claim 9, wherein the controller further comprises a plurality of single-arm robot interfaces, wherein each single-arm robot interface corresponds with the single-arm robot of a single cluster tool and is configured to communicate only with its corresponding single-arm robot, and wherein the controller is configured to control each single-arm robot via its corresponding single-arm robot interface.

* * * * *